United States Patent
Liu et al.

(10) Patent No.: US 11,139,936 B2
(45) Date of Patent: Oct. 5, 2021

(54) DATA TRANSMISSION METHOD, TERMINAL DEVICE, AND NETWORK DEVICE

(71) Applicant: HUAWEI TECHNOLOGIES CO., LTD., Guangdong (CN)

(72) Inventors: Xianda Liu, Beijing (CN); Kunpeng Liu, Beijing (CN); Ruiqi Zhang, Beijing (CN); Xueru Li, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/673,111

(22) Filed: Nov. 4, 2019

(65) Prior Publication Data

US 2020/0067663 A1 Feb. 27, 2020

Related U.S. Application Data

(63) Continuation of application No. PCT/CN2018/085502, filed on May 3, 2018.

(30) Foreign Application Priority Data

May 5, 2017 (CN) .......................... 201710312975.1

(51) Int. Cl.
*H04W 4/00* (2018.01)
*H04L 5/00* (2006.01)
(Continued)

(52) U.S. Cl.
CPC ........... *H04L 5/005* (2013.01); *H04B 7/0456* (2013.01); *H04W 72/042* (2013.01); *H04W 72/1268* (2013.01)

(58) Field of Classification Search
None
See application file for complete search history.

(56) References Cited

U.S. PATENT DOCUMENTS

| 9,350,435 B2 | 5/2016 | Zhang et al. |
| 2013/0064128 A1* | 3/2013 | Li .................... H04B 7/065 370/252 |

(Continued)

FOREIGN PATENT DOCUMENTS

| CN | 101867447 A | 10/2010 |
| CN | 102237955 A | 11/2011 |

(Continued)

OTHER PUBLICATIONS

R1-1611235 Huawei et al.,"Discussion on UL MIMO transmission",3GPP TSG RAN WG1 Meeting #87,Reno, USA Nov. 14-18, 2016,total 8 pages.

*Primary Examiner* — Clemence S Han
(74) *Attorney, Agent, or Firm* — Womble Bond Dickinson (US) LLP

(57) ABSTRACT

This application provides a data transmission method, terminal device, and network device. The method includes: sending, by a terminal device, at least one precoded reference signal on at least one reference signal resource corresponding to a first PRG, where different precoding matrixes are used for different reference signals, and the first PRG is a PRG used to transmit a reference signal; receiving, by the terminal device, resource indication information, where the resource indication information indicates a reference signal resource that is corresponding to a second PRG and that is in the at least one reference signal resource, and the second PRG is a PRG used to transmit a physical uplink shared channel (PUSCH); and sending, by the terminal device, a precoded PUSCH on the second PRG based on the resource indication information, where a precoding matrix used for the PUSCH is a precoding matrix used for a reference signal sent on the reference signal resource corresponding to the second PRG. In this way, a precoding matrix used to (Continued)

transmit the PUSCH on the second PRG can be effectively selected.

20 Claims, 12 Drawing Sheets

(51) Int. Cl.
*H04B 7/0456* (2017.01)
*H04W 72/04* (2009.01)
*H04W 72/12* (2009.01)

(56) References Cited

U.S. PATENT DOCUMENTS

| | | | |
|---|---|---|---|
| 2013/0163507 A1* | 6/2013 | Hoshino | H04B 7/155 370/315 |
| 2013/0215841 A1* | 8/2013 | Sun | H04B 7/065 370/329 |
| 2018/0227101 A1* | 8/2018 | Park | H04W 72/0413 |
| 2018/0324760 A1* | 11/2018 | Yuk | H04L 5/0044 |
| 2019/0190669 A1* | 6/2019 | Park | H04L 5/0048 |
| 2020/0099488 A1* | 3/2020 | Kim | H04B 7/0456 |
| 2020/0162134 A1* | 5/2020 | Kakishima | H04L 5/00 |
| 2020/0275416 A1* | 8/2020 | Haghighat | H04L 25/0204 |

FOREIGN PATENT DOCUMENTS

| | | |
|---|---|---|
| CN | 102404854 A | 4/2012 |
| WO | 2014111144 A1 | 7/2014 |

* cited by examiner

DATA TRANSMISSION METHOD, TERMINAL DEVICE, AND NETWORK DEVICE

CROSS-REFERENCE TO RELATED APPLICATIONS

This application is a continuation of International Application No. PCT/CN2018/085502, filed on May 3, 2018, which claims priority to Chinese Patent Application No. 201710312975.1, filed on May 5, 2017. The disclosures of the aforementioned applications are hereby incorporated by reference in their entireties.

TECHNICAL FIELD

This application relates to the communications field, and more specifically, to a data transmission method, terminal device, and network device.

BACKGROUND

A sounding reference signal (SRS) is used by a base station to determine quality of an uplink channel, to selectively schedule an uplink transmission resource for a terminal device. In an uplink transmission process, the terminal device precodes a plurality of SRSs by using different precoding matrixes. After receiving and measuring the SRS, the base station needs to select a corresponding precoding matrix for a precoding resource block group (PRG) used to transmit a physical uplink shared channel (PUSCH), so that the terminal device precodes the PUSCH by using the precoding matrix. In addition, the base station indicates, to the terminal device, a number index of an SRS resource used for the SRS corresponding to the precoding matrix, so that when sending uplink data, the terminal device precodes the PUSCH by using a precoding matrix corresponding to an SRS sent on an SRS resource.

When the terminal device sends the PUSCH, a same precoding matrix needs to be used for data on all physical resource blocks (PRBs) in a PRG used to transmit the PUSCH. Therefore, the base station needs to select a precoding matrix corresponding to each PRG for each PRG, so that the terminal device precodes the data transmitted on the PRG.

Because precoding matrixes used for PUSCHs transmitted on different PRGs may be different, how to effectively select a precoding matrix used to transmit a PUSCH on each PRG is a problem that urgently needs to be resolved.

SUMMARY

This application provides a data transmission method, terminal device, and network device, to effectively select a precoding matrix used to transmit a PUSCH on each PRG.

According to a first aspect, a data transmission method is provided, including: separately sending, by a terminal device, at least one precoded reference signal on at least one reference signal resource corresponding to a first precoding resource block group PRG, where different reference signals in the at least one reference signal are precoded by using different precoding matrixes, the first PRG is a PRG of the reference signal, and the reference signal includes a sounding reference signal SRS; receiving, by the terminal device, reference signal resource indication information, where the reference signal resource indication information is used to indicate a reference signal resource corresponding to a second PRG, and the reference signal resource corresponding to the second PRG is at least one reference signal resource selected from the at least one reference signal resource corresponding to the first PRG whose frequency domain position is the same as that of the second PRG, the second PRG is a PRG of a physical uplink shared channel PUSCH, and a size of the first PRG is equal to n times a size of the second PRG, where n is 1 or a positive integer greater than 1; and sending, by the terminal device, a precoded PUSCH on the second PRG based on the reference signal resource indication information, where a precoding matrix used for the PUSCH is determined based on a precoding matrix used for a reference signal sent on the reference signal resource corresponding to the second PRG.

In one embodiment, the reference signal resource indication information is carried in downlink control information (DCI), a media access control control element (MAC CE), or a physical downlink shared channel (PDSCH).

Therefore, in this embodiment of this application, a plurality of first PRGs used to transmit reference signals are set, and the terminal device sends, on the first PRG, a reference signal that is precoded by using a corresponding precoding matrix, so that a network device can effectively select, based on the reference signal transmitted on the first PRG, the precoding matrix used to transmit the PUSCH on the second PRG corresponding to the first PRG.

It should be understood that, bandwidth supported by the terminal device or a frequency domain resource of uplink transmission bandwidth of an entire system may be divided into a plurality of first PRGs including the first PRG, at least a part of at least one precoding matrix used for the at least one reference signal transmitted on the at least one reference signal resource corresponding to the first PRG is different from at least one precoding matrix used for at least one reference signal transmitted on at least one reference signal resource corresponding to another first PRG. The another first PRG is a first PRG that is in a plurality of first PRGs and whose frequency domain position is different from that of the first PRG, and a plurality of reference signal resources corresponding to a plurality of second PRGs of the PUSCH are at least one reference signal resource selected from a plurality of reference signal resources corresponding to the plurality of first PRGs whose frequency domain positions are the same as frequency domain positions of the plurality of second PRGs.

It should be further understood that the plurality of reference signal resources corresponding to the plurality of first PRGs correspond to same reference signal configuration information.

In other words, in the plurality of first PRGs, the precoding matrix used to transmit the reference signal is independent on each first PRG. It may be also understood as a meaning that, the bandwidth that can be currently used to send the reference signal may include the plurality of first PRGs, and the precoding matrix used for the reference signal transmitted on each first PRG may be different from the precoding matrix used for the reference signal transmitted on the another first PRG.

It should be further understood that, when the network device indicates the precoding matrix used to transmit the PUSCH to the terminal device, transmit bandwidth of the PUSCH may include the plurality of second PRGs, precoding matrixes used to transmit the PUSCH on each second PRG are different, and the network device needs a plurality pieces of reference signal resource indication information to separately indicate a precoding matrix used to transmit the PUSCH on the plurality of second PRGs. Herein, the network device implements an indication of the precoding matrix by indicating, to the terminal device, a number of a reference signal resource used for the reference signal corresponding to the precoding matrix.

In one embodiment, at least a part of at least one precoding matrix used for the at least one reference signal sent on the first PRG is different from at least one precoding matrix used for at least one reference signal sent on another first PRG, the another first PRG is a first PRG that is in a plurality of first PRGs and whose frequency domain position is different from that of the first PRG, and a plurality of reference signal resources corresponding to a plurality of second PRGs of the PUSCH are at least one reference signal resource selected from a plurality of reference signal resources corresponding to the plurality of first PRGs whose frequency domain positions are the same as frequency domain positions of the plurality of second PRGs.

In one embodiment, the size of the first PRG is equal to a size of n second PRGs, and n is a positive integer. That is, the size of the first PRG is equal to an integer multiple of the size of the second PRG.

Therefore, because the size of the first PRG is equal to an integer multiple of the size of the second PRG, precoding matrixes used to transmit the PUSCH on all PRBs in the second PRG may be selected from a same group of precoding matrixes (that is, precoding matrixes used for reference signals transmitted on the first PRG) without a requirement of signaling re-indication.

However, in the prior art, precoding matrixes used to transmit PUSCHs on different PRBs in one second PRG may be separately selected from several different groups of precoding matrixes (precoding matrixes used for reference signals transmitted on different first PRGs), and therefore, subsequently, other signaling is further required for indication, so that the precoding matrixes used to transmit the PUSCHs on all the PRBs in the second PRG are the same.

In one embodiment, if the reference signal resource corresponding to the second PRG is the same as a reference signal resource corresponding to an adjacent second PRG of the second PRG in n second PRGs whose frequency domain positions are the same as that of the first PRG, and the second PRG is a second PRG whose PRG number is minimum or maximum in the n second PRGs, the reference signal resource indication information is further used to indicate the reference signal resource corresponding to the adjacent second PRG.

Therefore, the network device only needs to indicate a reference signal resource corresponding to a second PRG whose PRG number is minimum, and the reference signal resource corresponding to the second PRG that is adjacent to the second PRG and that is in the n second PRGs may not be indicated, that is, the reference signal resource indication information used to indicate the reference signal resource corresponding to the adjacent second PRG may be omitted, thereby saving signaling overheads. Certainly, a reference signal resource corresponding to a second PRG whose PRG number is maximum may also be only indicated, and a reference signal resource corresponding to another second PRG whose PRG number is smaller may be omitted. This is not limited herein.

In one embodiment, the size of the second PRG is equal to a size of m first PRGs.

In one embodiment, the first PRG is a first PRG whose PRG number is minimum or maximum in the m first PRGs corresponding to the second PRG, and the reference signal resource corresponding to the second PRG is a reference signal resource in the at least one reference signal resource corresponding to the first PRG whose PRG number is minimum or maximum in the m first PRGs, where m is a positive integer.

In one embodiment, a frequency domain start/end position of the first PRG is the same as a frequency domain start/end position of the n second PRGs.

Further, in one embodiment, the frequency domain start/end position of the first PRG is the same as the frequency domain start/end position of a resource block group RBG, and the frequency domain start/end position of the second PRG is the same as the frequency domain start/end position of the RBG.

In one embodiment, the first PRG includes an entire frequency band used by the terminal device to transmit the at least one reference signal.

In one embodiment, before the sending, by the terminal device, a precoded PUSCH on the second PRG, the method further includes: receiving, by the terminal device, resource configuration information, where the resource configuration information indicates a frequency domain resource used to transmit the PUSCH, and the resource configuration information indicates the frequency domain resource in a frequency band used by the terminal device to transmit the at least one reference signal.

It should be understood that, in this case, a quantity of bits of a bitmap of the resource configuration information used to indicate the PUSCH depends on a bandwidth that can be used to transmit a reference signal rather than total system bandwidth. For example, the bandwidth used to transmit the reference signal is four RBGs, and the system bandwidth is 10 RBGs. In this case, the quantity of the bits of the bitmap of the resource configuration information used to indicate the PUSCH is 4.

In one embodiment, before the sending, by a terminal device, at least one precoded reference signal on at least one reference signal resource corresponding to a first PRG, the method further includes: receiving, by the terminal device, first indication information carried in higher layer signaling or downlink control information DCI, where the first indication information is used to indicate at least one of the following:

the size of the first PRG, the size of the second PRG, and a relationship indicating that the size of the first PRG is k times the size of the second PRG.

In one embodiment, the terminal device sends the reference signal by using a plurality of reference signal processes, and in the plurality of reference signal processes, a size of a first PRG in each reference signal process is the same as or different from a size of a first PRG in another reference signal process, and the reference signal resource corresponding to the second PRG is at least one of at least one reference signal resource corresponding to the first PRG that is of a reference signal process selected from the plurality of reference signal processes and that is indicated by using signaling.

In one embodiment, the reference signal includes a sounding reference signal SRS.

According to a second aspect, a data transmission method is provided, including: separately receiving, by a network device, at least one precoded reference signal on at least one reference signal resource corresponding to a first precoding resource block group PRG, where different reference signals in the at least one reference signal are precoded by using different precoding matrixes, the first PRG is a PRG of the reference signal, and the reference signal includes a sounding reference signal SRS; sending, by the network device, reference signal resource indication information, where the reference signal resource indication information is used to indicate a reference signal resource corresponding to a second PRG, and the reference signal resource corresponding to the second PRG is at least one reference signal resource selected from the at least one reference signal resource corresponding to the first PRG whose frequency domain position is the same as that of the second PRG, the second PRG is a PRG of a physical uplink shared channel PUSCH, and a size of the first PRG is equal to n times a size of the second PRG, where n is 1 or a positive integer greater than 1; and receiving, by the network device, a precoded PUSCH on the second PRG, where a precoding matrix used for the PUSCH is determined based on a precoding matrix used for a reference signal sent on the reference signal resource corresponding to the second PRG.

In one embodiment, the reference signal resource indication information is carried in downlink control information DCI, a media access control control element MAC CE, or a physical downlink shared channel PDSCH.

Therefore, in this embodiment of this application, a plurality of first PRGs used to transmit reference signals are set, and the terminal device sends, on the first PRG, a reference signal that is precoded by using a corresponding precoding matrix, so that a network device can effectively select, based on the reference signal transmitted on the first PRG, the precoding matrix used to transmit the PUSCH on the second PRG corresponding to the first PRG.

In one embodiment, at least a part of at least one precoding matrix used for the at least one reference signal sent on the first PRG is different from at least one precoding matrix used for at least one reference signal sent on another first PRG, the another first PRG is a first PRG that is in a plurality of first PRGs and whose frequency domain position is different from that of the first PRG, and a plurality of reference signal resources corresponding to a plurality of second PRGs of the PUSCH are at least one reference signal resource selected from a plurality of reference signal resources corresponding to the plurality of first PRGs whose frequency domain positions are the same as frequency domain positions of the plurality of second PRGs.

In one embodiment, the size of the first PRG is equal to a size of n second PRGs, and n is a positive integer.

In one embodiment, if the reference signal resource corresponding to the second PRG is the same as a reference signal resource corresponding to an adjacent second PRG of the second PRG in n second PRGs whose frequency domain positions are the same as that of the first PRG, and the second PRG is a second PRG whose PRG number is minimum or maximum in the n second PRGs, the reference signal resource indication information is further used to indicate the reference signal resource corresponding to the adjacent second PRG.

In one embodiment, the first PRG is a first PRG whose PRG number is minimum or maximum in m first PRGs corresponding to the second PRG, and the reference signal resource corresponding to the second PRG is a reference signal resource in the at least one reference signal resource corresponding to the first PRG whose PRG number is minimum or maximum in the m first PRGs, where m is a positive integer.

In one embodiment, a frequency domain start/end position of the first PRG is the same as a frequency domain start/end position of the n second PRGs.

Further, in one embodiment, the frequency domain start/end position of the first PRG is the same as the frequency domain start/end position of a resource block group RBG, and the frequency domain start/end position of the second PRG is the same as the frequency domain start/end position of the RBG.

In one embodiment, the first PRG includes an entire frequency band used by the terminal device to transmit the reference signal.

In one embodiment, before the receiving, by the network device, a precoded PUSCH on the second PRG, the method further includes: sending, by the network device, resource configuration information, where the resource configuration information indicates a frequency domain resource used to transmit the PUSCH, and the resource configuration information indicates the frequency domain resource in a frequency band used by the terminal device to transmit the at least one reference signal.

In one embodiment, before the receiving, by a network device, at least one precoded reference signal on at least one reference signal resource corresponding to a first PRG, the method further includes: sending, by the network device, first indication information carried in higher layer signaling or downlink control information DCI, where the first indication information is used to indicate at least one of the following:

the size of the first PRG, the size of the second PRG, and a relationship indicating that the size of the first PRG is k times the size of the second PRG, where is a positive integer.

In one embodiment, the network device receives the at least one reference signal in a plurality of reference signal processes, and in the plurality of reference signal processes, a size of a first PRG in each reference signal process is the same as or different from a size of a first PRG in another reference signal process, and the reference signal resource corresponding to the second PRG is at least one of at least one reference signal resource corresponding to the first PRG that is of a reference signal process selected from the plurality of reference signal processes and that is indicated by using signaling.

In one embodiment, the reference signal includes a sounding reference signal SRS.

According to a third aspect, a terminal device is provided. The terminal device may perform an operation of the terminal device in the first aspect or any embodiments of the first aspect. Specifically, the terminal device may include a module or unit configured to perform the operation of the terminal device in the first aspect or any embodiments of the first aspect.

According to a fourth aspect, a network device is provided. The network device may perform an operation of the network device in the second aspect or any embodiments of the second aspect. Specifically, the network device may include a module or unit configured to perform the operation of the network device in the second aspect or any embodiments of the second aspect.

According to a fifth aspect, a terminal device is provided. The terminal device includes a processor, a transceiver, and a memory. The processor, the transceiver, and the memory communicate with each other over an internal connection path. The memory is configured to store an instruction, and the processor is configured to execute the instruction stored in the memory. When the processor executes the instruction stored in the memory, the terminal device performs the method in the first aspect or any embodiments of the first aspect, or the terminal device implements the terminal device provided in the third aspect.

According to a sixth aspect, a network device is provided. The network device includes a processor, a transceiver, and a memory. The processor, the transceiver, and the memory communicate with each other over an internal connection path. The memory is configured to store an instruction, and the processor is configured to execute the instruction stored in the memory. When the processor executes the instruction stored in the memory, the network device performs the method in the second aspect or any embodiments of the second aspect, or the network device implements the network device provided in the fourth aspect.

According to a seventh aspect, a computer-readable storage medium is provided. The computer-readable storage medium stores a program, and the program enables a terminal device to perform the information transmission method in any one of the first aspect and the implementations of the first aspect.

According to an eighth aspect, a computer-readable storage medium is provided. The computer-readable storage medium stores a program, and the program enables a network device to perform the information transmission method in any one of the second aspect and the implementations of the second aspect.

According to a ninth aspect, a system chip is provided. The system chip includes an input interface, an output interface, a processor, and a memory, and the processor is configured to execute an instruction stored in the memory. When the instruction is executed, the processor may implement the method in any one of the first aspect and the implementations of the first aspect.

According to a tenth aspect, a system chip is provided. The system chip includes an input interface, an output interface, a processor, and a memory, and the processor is configured to execute an instruction stored in the memory. When the instruction is executed, the processor may implement the method in any one of the second aspect and the implementations of the second aspect.

DESCRIPTION OF EMBODIMENTS

The following describes technical solutions in embodiments of this application with reference to accompanying drawings.

Figure 1:
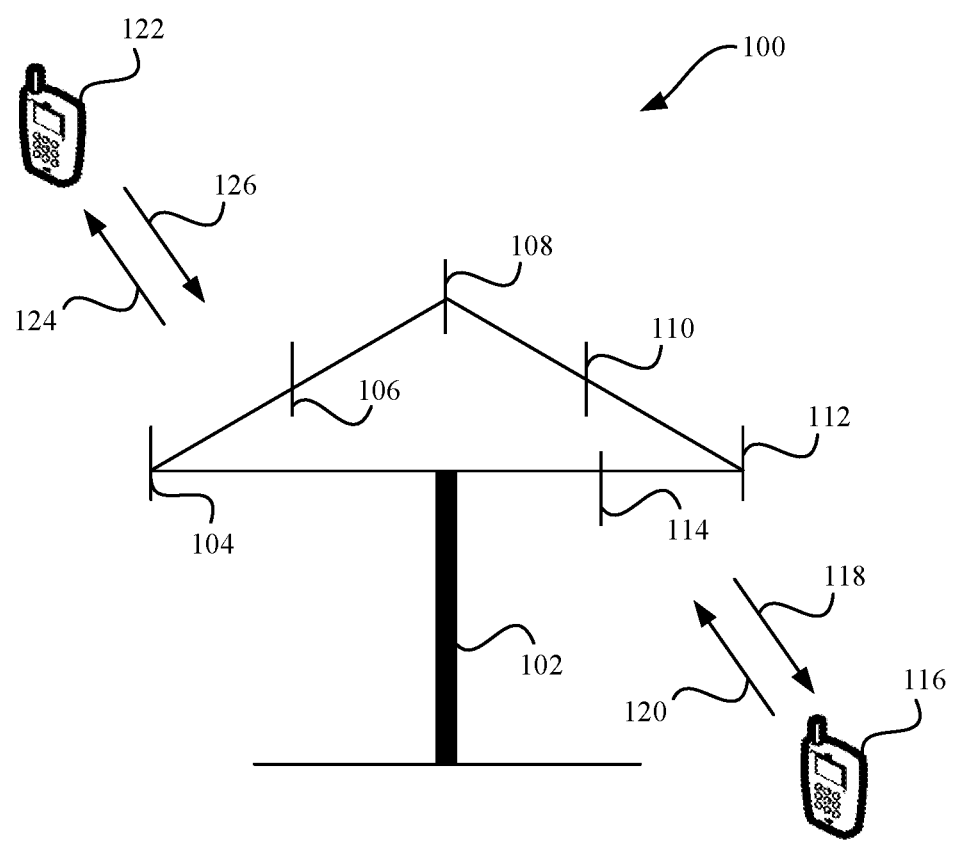
FIG. 1 is a schematic architectural diagram of an application scenario according to an embodiment of this application.

For ease of understanding of the embodiments of this application, a communications system to which the embodiments of this application are applicable is described in detail with reference to FIG. 1. FIG. 1 is a schematic diagram of a communications system to which a data transmission method and apparatus are applicable according to an embodiment of this application. As shown in FIG. 1, a communications system 100 includes a network device 102. The network device 102 may include a plurality of antennas, for example, antennas 104, 106, 108, 110, 112, and 114. In addition, the network device 102 may additionally include a transmitter chain and a receiver chain. A person of ordinary skill in the art may understand that the transmitter chain and the receiver chain each may include a plurality of components (such as a processor, a modulator, a multiplexer, a demodulator, a demultiplexer, or an antenna) related to signal sending and receiving.

It should be understood that the technical solutions in this application may be applied to various communications systems, for example: a global system for mobile communications (GSM), a code division multiple access (CDMA) system, a wideband code division multiple access ( ) system, and a general packet radio service (GPRS) system, a long term evolution (LTE) system, a long term evolution advanced (LTE-A) system, a universal mobile telecommunications system (UMTS), or a next-generation communications system (for example, a fifth-generation (5G) communications system). The 5G system may be also referred to as a new radio (NR) access technology system.

It should be understood that the network device 102 may be a base transceiver station (BTS) in the GSM or the CDMA, or may be a NodeB (NB) in the WCDMA, or may be an evolved NodeB (eNB or eNodeB) in the LTE, or a relay node, an access point, or a remote radio unit (RRU), or a vehicle-mounted device, a wearable device, and a network side device in a future 5G system, such as a transmission point (TP), a transmission reception point (TRP), a base station, a small cell device, and the like. This is not specifically limited in the embodiments of this application.

The network device 102 may communicate with a plurality of terminal devices (for example, a terminal device 116 and a terminal device 122). The network device 102 may communicate with any quantity of terminal devices similar to the terminal device 116 or 122.

It should be understood that the terminal device 116 or 122 may be also referred to as user equipment (UE), an access terminal, a subscriber unit, a subscriber station, a mobile station, a mobile station, a remote station, a remote terminal, a mobile device, a user terminal, a terminal, a wireless communications device, a user agent, or a user apparatus. The terminal device may be a station (ST) in a wireless local area network (WLAN), or may be a cellular phone, a cordless phone, a session initiation protocol (SIP) phone, a wireless local loop (WLL) station, a personal digital assistant (PDA) device, a handheld device or computing device having a wireless communication function, another processing device connected to a wireless modem, a vehicle-mounted device, a wearable device, and a terminal device in a next-generation communications system, for example, a terminal device in a 5G network or a terminal device in a future evolved public land mobile network (PLMN). This is not specifically limited in the embodiments of this application.

As shown in FIG. 1, the terminal device 116 communicates with the antennas 112 and 114. The antennas 112 and 114 send information to the terminal device 116 by using a forward link 118, and receive information from the terminal device 116 by using a reverse link 120. In addition, the terminal device 122 communicates with the antennas 104 and 106. The antennas 104 and 106 send information to the terminal device 122 by using a forward link 124, and receive information from the terminal device 122 by using a reverse link 126.

For example, in a frequency division duplex (FDD) system, the forward link 118 and the reverse link 120 may use different frequency bands, and the forward link 124 and the reverse link 126 may use different frequency bands.

For another example, in a time division duplex (TDD) system and a full duplex system, the forward link 118 and the reverse link 120 may share a same frequency band, and the forward link 124 and the reverse link 126 may share a same frequency band.

Each antenna (or an antenna group including a plurality of antennas) and/or an area designed for communication is referred to as a sector of the network device 102. For example, an antenna group may be designed to communicate with a terminal device in a sector within coverage of the network device 102. In a process in which the network device 102 communicates with the terminal devices 116 and 122 by using the forward links 118 and 124 respectively, a transmit antenna of the network device 102 may improve signal-to-noise ratios of the forward links 118 and 124 through beamforming. In addition, in comparison with a manner in which the network device sends, by using a single antenna, signals to all terminal devices served by the network device, when the network device 102 sends signals to the randomly scattered terminal devices 116 and 122 in related coverage through beamforming, a mobile device in a neighboring cell is less affected.

The network device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain (for example, generate, receive from another communications apparatus, or store in a memory) a particular quantity of data bits that need to be sent to the wireless communications receiving apparatus through a channel. The data bits may be included in a transport block (or a plurality of transport blocks) of data, and the transport block may be segmented to generate a plurality of code blocks.

In addition, the communications system 100 may be a PLMN, a device-to-device (D2D) network, a machine-to-machine (M2M) network, or another network. FIG. 1 is merely a simplified schematic diagram of an example used for ease of understanding, and the network may further include another network device, which is not shown in FIG. 1.

In a LTE system, before sending uplink data to a network device, a terminal device sends a SRS, so that the network device determines channel quality of an uplink channel. An SRS resource is a physical resource used for sending an SRS, such as an antenna port, a time-frequency resource, power, and an encoding manner. Generally, the SRS is sent on a last symbol in a configured subframe, and an SRS time-frequency resource used for sending the SRS may be determined based on at least one configuration parameter in Table 1. Minimum detection bandwidth supported in the LTE is four physical resource blocks, and there is a relationship indicating that one type of detection bandwidth is an integer multiple of another type of detection bandwidth in several types of detection bandwidth supported in the system.

TABLE 1

| SRS parameter name | Meaning | Signaling type |
| --- | --- | --- |
| SRS-bandwidth configuration (SRS-Bandwidth Config) | Maximum SRS bandwidth in a cell | Cell-specific |
| SRS-subframe configuration (SRS-Bandwidth Config) | Subframe group on which an SRS may be sent in a cell | Cell-specific |
| SRS bandwidth (SRS-Bandwidth) | SRS bandwidth of one UE | UE-specific |
| Frequency domain position (Freq Domain Position) | Frequency domain position | UE-specific |
| SRS-hopping bandwidth (SRS-Hopping Bandwidth) | Frequency hopping size | UE-specific |
| Duration (Duration) | Single SRS/Periodic SRS | UE-specific |
| Transmission comb (Transmission Comb) | Transmission comb compensation | UE-specific |
| Cyclic shift (Cyclic Shift) | Cyclic shift | UE-specific |

For downlink transmission, the terminal device measures and reports channel state information (CSI), and the CSI includes a precoding matrix indicator (PMI). The PMI is used to indicate a precoding matrix used for transmission of a physical downlink shared channel (PDSCH). PMI reporting is divided into PMI reporting of broadband and PMI reporting of a subband. When the terminal device is configured with the PMI reporting of the broadband, the terminal device reports one PMI, and the PMI is corresponding to entire system bandwidth. When the terminal device is configured with the PMI reporting of the subband, the terminal device reports a plurality of PMIs, and the plurality of PMIs are respectively corresponding to subbands. The network device may alternatively precode downlink data transmitted on a plurality of consecutive PRBs by using a same precoding matrix. In this case, it is specified in a protocol that the terminal device may consider that each PRB in a precoding resource block group (Precoding Resource block Group, PRG) uses a fixed precoding matrix. In other words, a precoding matrix in a frequency band corresponding to the PRG does not change with a frequency.

In addition, in resource allocation, the network device indicates, to the terminal device by using downlink control information (DCI), a resource allocated to the terminal device. The DCI is control information that is in a physical layer and that is used by the network device to indicate behavior of the terminal device. A time-frequency resource occupied by the downlink data sent by the network device is indicated to the terminal device in a form of a resource block group (RBG) by using DCI signaling. An RBG size is a function of the system bandwidth, and the RBG includes a group of consecutive PRBs. In this case, to be consistent with a granularity of resource scheduling, the RBG size is an integer multiple of a PRG size. An example is shown in Table 2.

TABLE 2

| System bandwidth | Subband size | RBG size | PBG size |
|---|---|---|---|
| <10 | 4 | 1 | 1 |
| 11-26 | 4 | 2 | 2 |
| 27-63 | 6 | 3 | 3 |
| 64-110 | 8 | 4 | 2 |

For uplink transmission, based on prior channel information or uplink and downlink channel reciprocity, the UE may precode a plurality of SRSs that are sent by using a plurality of SRS resources, to obtain a plurality of precoded SRSs. Precoding matrixes corresponding to SRSs transmitted by using different SRS resources are different. The network device receives and measures the plurality of SRSs, and selects, based on a specific implementation algorithm, a precoding matrix used to transmit a PUSCH on each PRG, and indicates, to the terminal device, a number of an SRS resource that is used for an SRS and that is corresponding to the precoding matrix; and a number of each SRS resource is indicated by the network device to the terminal device by using RRC signaling. Different common SRS resources all correspond to different resource numbers, and the resource numbers are indicated by the network device to the terminal device by using higher layer signaling. The higher layer signaling is indication information that is of a layer higher than a physical layer and that is used to control and manage a related terminal device, for example, radio resource control (RRC) signaling.

If the terminal device needs to be scheduled to transmit a physical uplink shared channel PUSCH in this case, the network device indicates the number of the SRS resource to the terminal device by using SRS resource indication (SRI) signaling. After receiving the SRI in the DCI and successfully decoding the SRI, the terminal device determines the precoding matrix used for the SRS sent on the SRS resource indicated in the SRI, precodes the PUSCH based on the precoding matrix, and sends the precoded PUSCH based on resource scheduling information in the DCI.

Figure 2:
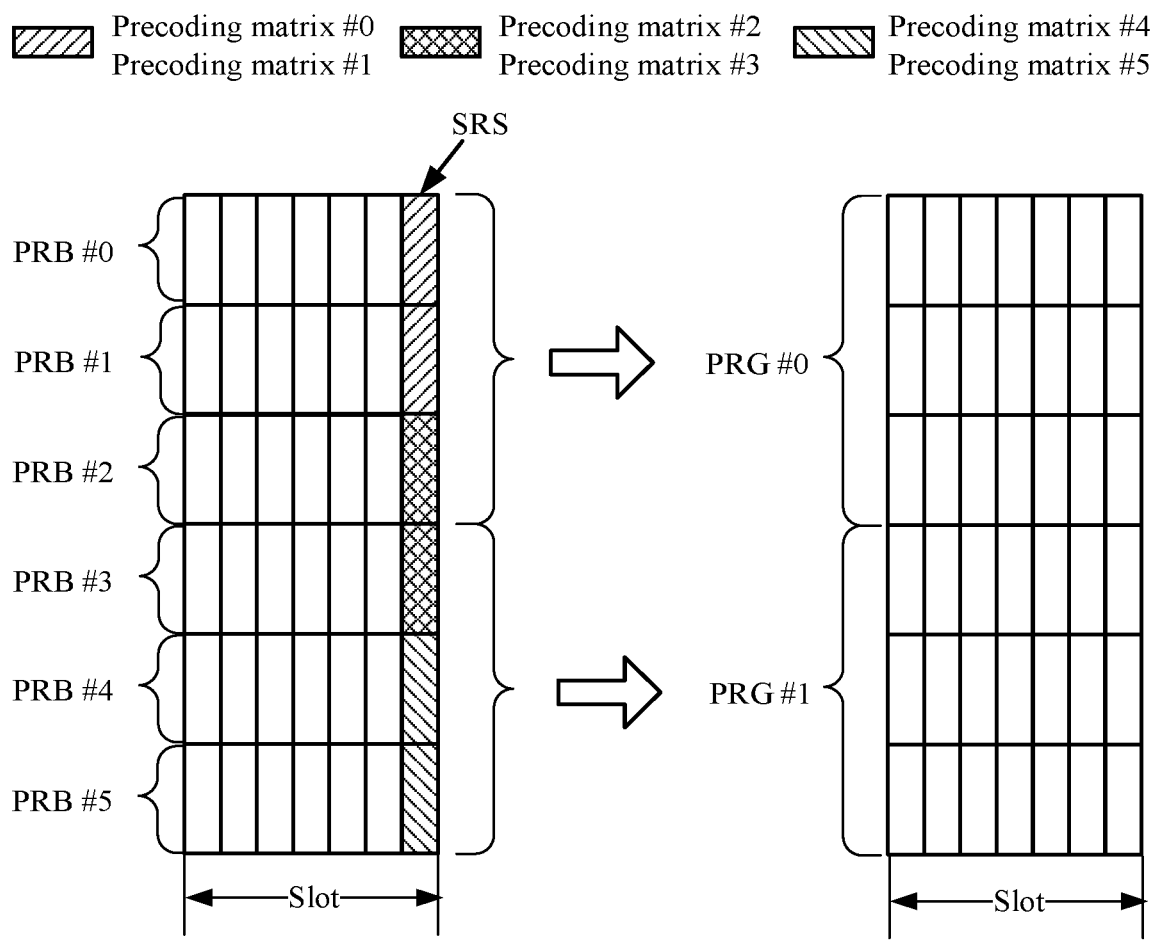
FIG. 2 is a schematic diagram of a resource for transmitting an SRS in the prior art.

In a new radio (NR) system, alternatively referred to as a 5G system, the network device determines, by measuring the precoded SRS sent by the terminal device, a precoding matrix that needs to be used by the terminal device to transmit uplink data, and indicates the precoding matrix to the terminal device by using an SRI. When the terminal device sends the precoded SRS, precoding matrixes corresponding to SRSs transmitted on different subbands may be different. As shown in FIG. 2, the terminal device precodes, by using a precoding matrix #0 and a precoding matrix #1, SRSs sent on a PRB #0 and a PRB #1, one SRS is precoded on the PRB #0 and the PRB #1 by using the precoding matrix #0, and another SRS is precoded on the PRB #0 and the PRB #1 by using the precoding matrix #1. The terminal device precodes, by using a precoding matrix #2 and a precoding matrix #3, SRSs sent on resource blocks PRB #2 and PRB #3. One SRS is precoded on the PRB #2 and the PRB #3 by using the precoding matrix #2, and another SRS is precoded on the PRB #2 and the PRB #3 by using the precoding matrix #3. The terminal device precodes, by using a precoding matrix #4 and a precoding matrix #5, two SRSs sent on resource blocks PRB #4 and PRB #5. One SRS is precoded on the PRB #4 and the PRB #5 by using the precoding matrix #4, and the other SRS is precoded on the PRB #4 and the PRB #5 by using the precoding matrix #5.

When the network device indicates, to the terminal device, the precoding matrix used to transmit the PUSCH, bandwidth used to send the PUSCH may include a plurality of different PRGs, and a different precoding matrix is used to transmit the PUSCH on each PRG. The network device needs to respectively indicate, by using SRI signaling, numbers of SRS resources corresponding to a second PRG #0 and a second PRG #1, so that the terminal device precodes the PUSCH based on the precoding matrix used for the SRS transmitted on the SRS resource corresponding to each PRG.

As shown in FIG. 2, when the network device selects the precoding matrix used to transmit the PUSCH on the PRG #0, the precoding matrix used to transmit the PUSCH on the PRB #0 and the PRB #1 in the PRG #0 is one of the precoding matrix #0 and the precoding matrix #1, and the precoding matrix used to transmit the PUSCH on the PRB #2 in the PRG #0 is one of the precoding matrix #2 and the precoding matrix #3. The PUSCHs transmitted on the PRG #0 need to be precoded by using a same precoding matrix. In other words, PUSCHs transmitted on the PRB #0, the PRB #1, and the PRB #2 need to use the same precoding matrix. In this way, when the network device selects, for the PRG #0, a precoding matrix used to transmit the PUSCHs, the network device not only needs to select, from the precoding matrix #0 and the precoding matrix #1, a precoding matrix that matches the PRB #0 and the PRB #1, but also needs to select, from the precoding matrix #2 and the precoding matrix #3, a precoding matrix that matches the PRB #2.

Because the precoding matrix that matches the PRB #0 and the PRB #1 is different from the precoding matrix that matches the PRB #2, when the network device selects the precoding matrix corresponding to the PRG #0, additional signaling needs to be introduced to instruct to select different precoding matrixes, or a rule for selecting a precoding matrix needs to be defined. If additional indication signaling is added to instruct to select different precoding matrixes, a large quantity of signaling overheads are caused.

It should be understood that, in this embodiment of this application, it is proposed that for a first PRG of a reference signal, the PRG of the PUSCH is referred to as a second PRG. The first PRG is the PRG of the reference signal, and the second PRG is the PRG of the PUSCH.

In this embodiment of this application, a plurality of first PRGs used to transmit reference signals are set, and the terminal device sends, on the first PRG, a reference signal that is precoded by using a corresponding precoding matrix, so that the network device can effectively select, based on the reference signal transmitted on the first PRG, a precoding matrix used to transmit a PUSCH on the second PRG corresponding to the first PRG.

The following describes in detail the data transmission method in the embodiments of this application with reference to FIG. 3 to FIG. 9. It should be understood that the examples are merely used to help a person skilled in the art to better understand the embodiments of this application, but are not intended to limit the scope of the embodiments of this application. It should be understood that, a transmit end is a network device, and a receive end is a terminal device. In other words, the network device may send downlink data to at least two terminal devices on a same time-frequency resource. Alternatively, the transmit end is a terminal device, and the receive end is a network device. In other words, at least two terminal devices may send uplink data to a same network device on a same time-frequency resource.

Without loss of generality, the following describes the data transmission method in the embodiments of this application by using a data transmission process between a network device and a terminal device as an example. It should be understood that the network device may be corresponding to the network device 102 in FIG. 1, and the terminal device may be any one of a plurality of terminal devices that communicate with and are connected to the network device, and may be corresponding to the terminal device 116 or the terminal device 122 in FIG. 1.

Figure 3:
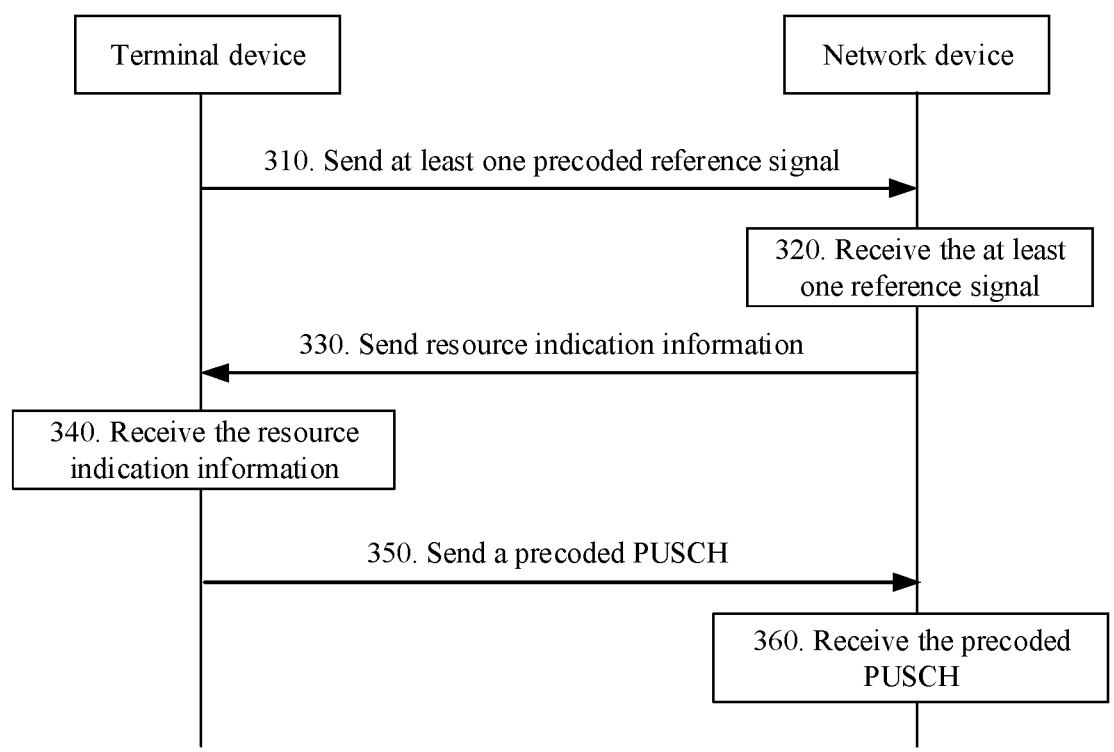
FIG. 3 is an interaction flowchart of a data transmission method according to an embodiment of this application.

FIG. 3 is a schematic flowchart of a data transmission method according to an embodiment of this application. A terminal device in FIG. 3 may be any one of a plurality of terminal devices that communicate with and are connected to the network device. For example, the terminal device in FIG. 3 may be corresponding to the terminal device 116 or the terminal device 122 in FIG. 1. A network device in FIG. 3 may be, for example, corresponding to the network device 102 in FIG. 1. As shown in FIG. 3, the data transmission method may include the following operations.

Operation 310. The terminal device respectively sends at least one precoded reference signal on at least one reference signal resource corresponding to a first PRG.

Different reference signals in the at least one reference signal use different precoding matrixes for precoding, and the first PRG is a PRG used to transmit a reference signal. The precoding matrix used for the reference signal transmitted in a frequency band corresponding to each first PRG does not change with a frequency, and a plurality of first PRGs have same frequency band bandwidth.

Specifically, the terminal device may determine, based on prior channel information or uplink and downlink channel reciprocity, at least one precoding matrix corresponding to the first PRG, and separately precode the at least one reference signal by using the at least one precoding matrix. Different reference signals in the at least one reference signal are precoded by using different precoding matrixes, and the different reference signals are transmitted on different reference signal resources of the first PRG.

It should be understood that the first PRG may be understood as a form used to precode the reference signal, and indicates a quantity of a plurality of consecutive PRBs that use a same precoding matrix.

In one embodiment, the reference signal may be a sounding reference signal SRS, or the like.

In one embodiment, before operation 310, the method further includes: receiving, by the terminal device, first indication information, where the first indication information is used to indicate at least one of the following:

a size of the first PRG, a size of the second PRG, and a relationship indicating that the size of the first PRG is k times the size of the second PRG, where k is 1 or a positive integer greater than 1.

Further, in one embodiment, the first indication information is carried in higher layer signaling or downlink control information DCI. The higher layer signaling may be, for example, RRC signaling or a medium access control (MAC) control element (CE), and the MAC CE carries control information of a MAC layer.

It should be understood that the size of the first PRG may be indicated by the network device to the terminal device by using the first indication information, or may be independently set by the terminal device by measuring a downlink reference signal by using the prior channel information or with reference to channel reciprocity. Alternatively, the network device and the terminal device may agree on the size of the first PRG in advance, so that the network device does not need to indicate the size of the first PRG to the terminal device by using the first indication information. The network device may directly indicate the size of the first PRG, or may indicate the relationship between the size of the first PRG and the size of the second PRG. For example, if the network device indicates that the size of the first PRG is equal to the size of the second PRG, the terminal device may obtain the size of the first PRG by using the size of the second PRG.

It should be further understood that a frequency domain resource used by the terminal device to transmit the reference signal may be divided into a plurality of first PRGs including the first PRG. At least a part of the at least one precoding matrix used for the at least one reference signal sent on the first PRG is different from at least one precoding matrix used for at least one reference signal sent on another first PRG; and the another first PRG is a first PRG that is in the plurality of first PRGs and whose frequency domain position is different from that of the first PRG.

A plurality of reference signal resources corresponding to a plurality of second PRGs of the PUSCH are at least one reference signal resource selected from a plurality of reference signal resources corresponding to the plurality of first PRGs whose frequency domain positions are the same as frequency domain positions of the plurality of second PRGs.

To be specific, in the plurality of first PRGs, the precoding matrix used to transmit the reference signal is independent on each first PRG. It may be also understood that, the bandwidth that can be currently used to send the reference signal may include the plurality of first PRGs, and at least one precoding matrix used for a reference signal transmitted on each first PRG may be different from at least one precoding matrix used for a reference signal transmitted on the another first PRG.

It should be understood that, herein, the bandwidth supported by the terminal device or a frequency domain resource of uplink transmission bandwidth of an entire system may be divided into a plurality of consecutive first PRGs including the first PRG, and the plurality of consecutive first PRGs have a same size and do not overlap with each other. For example, the bandwidth supported by the terminal device includes 48 PRBs, and a size of each first PRG is 6 PRBs. The entire frequency band is divided into 8 first PRGs (a PRB #0 to a PRB #5, a PRB #6 to a PRB #10, and a PRB #11 to a PRB #15 . . . ), and each first PRG includes a same quantity of consecutive PRBs. In addition, reference signals sent on PRBs in a frequency band corresponding to each first PRG are precoded by using a same precoding matrix, and reference signals sent on PRBs in frequency bands corresponding to different first PRGs are precoded by using different precoding matrixes. For example, two reference signals transmitted on a frequency band of the PRB #0 to PRB #5 are respectively precoded by using a precoding matrix #0 and a precoding matrix #1, and two reference signals transmitted on a frequency band of the PRB #6 to PRB #11 are respectively precoded by using a precoding matrix #2 and a precoding matrix #3.

For example, in the plurality of first PRGs, two reference signals transmitted on a first PRG #1 respectively use the precoding matrix #0 and the precoding matrix #1, and two reference signals transmitted on a first PRG #1 respectively use the precoding matrix #2 and the precoding matrix #3. The reference signals transmitted on the first PRG #0 and the first PRG #1 are precoded by using different precoding matrixes. For example, in the two reference signals, one reference signal is precoded on the first PRG #0 by using the precoding matrix #0, and is precoded on the first PRG #1 by using the precoding matrix #2. The other reference signal is precoded on the first PRG #0 by using the precoding matrix #1, and is precoded on the first PRG #1 by using the precoding matrix #3.

It should be further understood that, the bandwidth supported by the terminal device or the frequency domain resource of the uplink transmission bandwidth of the entire system may be divided into a plurality of consecutive second PRGs including the second PRG, and the plurality of consecutive second PRGs have a same size and do not overlap with each other. For example, the bandwidth supported by the terminal device includes 48 PRBs, and a size of each second PRG is 3 PRBs. The entire frequency band is divided into 16 first PRGs (a PRB #0 to a PRB #2, a PRB #3 to a PRB #5, and a PRB #6 to a PRB #8 . . . ), and each second PRG includes a same quantity of consecutive PRBs. In addition, PUSCHs sent on PRBs in a frequency band corresponding to each second PRG are precoded by using a same precoding matrix, and PUSCHs sent on PRBs in frequency bands corresponding to different second PRG are precoded by using different precoding matrixes. For example, PUSCHs transmitted on a frequency band of the PRB #0 to PRB #2 are precoded by using the precoding matrix #0 and the precoding matrix #1, and PUSCHs transmitted on a frequency band of the PRB #3 to PRB #5 are precoded by using the precoding matrix #2 and the precoding matrix #3, and so on.

Operation 320. The network device receives the at least one precoded reference signal on the at least one reference signal resource corresponding to the first PRG.

Different reference signals in the at least one reference signal use different precoding matrixes for precoding, and the first PRG is a PRG used to transmit a reference signal.

In one embodiment, before operation 320, the method further includes: sending, by the network device, the first indication information, where the first indication information is used to indicate at least one of the following:

the size of the first PRG, the size of the second PRG, and the relationship indicating that the size of the first PRG is k times the size of the second PRG.

Further, in one embodiment, the first indication information is carried in higher layer signaling or downlink control information DCI.

Operation 330. The network device sends reference signal resource indication information.

The reference signal resource indication information is used to indicate a reference signal resource that is corresponding to the second PRG and that is in the at least one reference signal resource. The reference signal resource corresponding to the second PRG is at least one reference signal resource selected from the at least one reference signal resource corresponding to the first PRG whose frequency domain position is the same as that of the second PRG. The second PRG is a PRG used to transmit a physical uplink shared channel PUSCH.

In other words, the reference signal resource corresponding to the second PRG belongs to one or more of the at least one reference signal resource whose frequency domain position is the same as that of the second PRG and that is in the first PRG.

In one embodiment, the reference signal resource indication information is carried in the downlink control information DCI, the media access control control element MAC CE, or a physical downlink shared channel PDSCH.

In one embodiment, the size of the first PRG is equal to n times the size of the second PRG, and n is 1 or a positive integer greater than 1. The reference signal resource that is indicated in the reference signal resource indication information and that is corresponding to each second PRG is a reference signal resource in the at least one reference signal resource whose frequency domain position is the same as that of the second PRG and that is in the first PRG.

Specifically, after receiving the at least one reference signal on the first PRG, the network device detects the at least one reference signal, selects, for the second PRG, a precoding matrix used to transmit the PUSCH, and indicates, to the terminal device, a number of a reference signal resource used for the reference signal corresponding to the precoding matrix, so that the terminal device precodes a to-be-sent PUSCH based on the precoding matrix used for the reference signal transmitted on the reference signal resource.

It should be understood that, when the network device indicates, to the terminal device, the precoding matrix used to transmit the PUSCH, transmit bandwidth of the PUSCH may include the plurality of second PRGs, precoding matrixes used to transmit the PUSCH on each second PRG are different, and the network device needs a plurality pieces of reference signal resource indication information to separately indicate precoding matrixes used to transmit the PUSCHs on the plurality of second PRGs. Herein, the network device implements an indication of the precoding matrix by indicating, to the terminal device, the number of the reference signal resource used for the reference signal corresponding to the precoding matrix.

For example, in the plurality of second PRGs, reference signals sent on two reference signal resources in the first PRG that are corresponding to the second PRG #0 respectively use the precoding matrix #0 and the precoding matrix #1, the reference signals sent on the two reference signal resources in the first PRG that are corresponding to the second PRG #1 respectively use the precoding matrix #2 and the precoding matrix #3. The network device needs two pieces of SRI signaling. One SRI is specific to the second PRG #0, and a precoding matrix that matches the second PRG #0 is selected from the precoding matrix #0 and the precoding matrix #1. Another SRI is specific to the second PRG #1, and a precoding matrix that matches the second PRG #1 is selected from the precoding matrix #2 and the precoding matrix #3.

Operation 340. The terminal device receives the reference signal resource indication information.

The reference signal resource indication information is used to indicate the reference signal resource that is corresponding to the second PRG and that is in the at least one reference signal resource, and the second PRG is the PRG used to transmit the physical uplink shared channel PUSCH.

In one embodiment, the reference signal resource indication information is carried in the DCI, the MAC CE, or a physical downlink shared channel PDSCH.

Specifically, after the terminal device sends the at least one precoded reference signal to the network device on the at least one reference signal resource corresponding to the first PRG, the network device detects the at least one reference signal, selects a precoding matrix used to transmit data on the second PRG, and indicates, to the terminal device, the number of the reference signal resource used to receive the reference signal. After receiving the reference signal resource indication information, the terminal device obtains, based on the reference signal resource indication information, the reference signal resource that is corresponding to the second PRG and that is in the at least one reference signal resource.

Operation 350. The terminal device sends a precoded PUSCH on a second PRG based on the reference signal resource indication information.

The precoding matrix used for the PUSCH is determined based on the precoding matrix used for the reference signal sent on the reference signal resource corresponding to the second PRG.

It should be understood that, the precoding matrix used for the PUSCH may be the same as the precoding matrix used for the reference signal sent on the reference signal resource corresponding to the second PRG; or may be a precoding matrix related to the precoding matrix used for the reference signal sent on the reference signal resource corresponding to the second PRG. For example, the precoding matrix used for the reference signal sent on the reference signal resource corresponding to the second PRG is M, the precoding matrix used for the PUSCH may be also M, or may be a precoding matrix obtained by further processing M, for example, a precoding matrix M*M1.

It should be further understood that, in this embodiment of this application, an example in which the precoding matrix used for the PUSCH is the same as the precoding matrix used for the reference signal sent on the reference signal resource corresponding to the second PRG is used for description. However, this application is not limited thereto. The precoding matrix used for the PUSCH may be also another precoding matrix related to the precoding matrix used for the reference signal sent on the reference signal resource corresponding to the second PRG.

Herein, reference signal resources indicated in different pieces of reference signal resource indication information are different from the reference signal resource corresponding to the second PRG. Therefore, different PUSCHs transmitted on the second PRG may be precoded by using different precoding matrixes.

Specifically, the terminal device obtains, based on the received reference signal resource indication information, the reference signal resource that is indicated in the reference signal resource indication information and that is corresponding to the second PRG, to precode the to-be-sent PUSCH based on the precoding matrix used for the reference signal sent on the reference signal resource, and send the precoded PUSCH to the network device.

For example, the reference signal is an SRS, and the terminal device receives an SRS resource indication SRI sent by the network device, to obtain a number of an SRS resource indicated in the SRI, and precode a to-be-transmitted PUSCH by using a precoding matrix corresponding to an SRS sent on the SRS resource.

In one embodiment, before operation 350, the method further includes: receiving, by the terminal device, resource configuration information, where the resource configuration information indicates a frequency domain resource used to transmit the PUSCH, and the resource configuration information indicates the frequency domain resource in a frequency band used by the terminal device to transmit the at least one reference signal.

It should be understood that, in this case, a quantity of bits of a bitmap (bitmap) of the resource configuration information used to indicate the PUSCH depends on bandwidth that can be used to transmit a reference signal rather than total system bandwidth. For example, the bandwidth used to transmit the reference signal is four RBGs, and the system bandwidth is 10 RBGs. In this case, the quantity of the bits of the bitmap of the resource configuration information used to indicate the PUSCH is 4.

Because the resource configuration information that is sent by the network device to the terminal device and that is used to indicate a transmission resource of the PUSCH indicates, based on the frequency band that can be used by the terminal device to transmit the reference signal, the frequency band used to transmit the PUSCH, instead of indicating, based on the entire system bandwidth, the frequency band used to transmit the PUSCH, thereby saving signaling overheads.

Operation 360. The network device receives the precoded PUSCH on the second PRG.

The precoding matrix used for the PUSCH is determined based on the precoding matrix used for the reference signal sent on the reference signal resource corresponding to the second PRG.

Therefore, in this embodiment, the first PRG used to transmit the reference signal is set, so that the terminal device can transmit the precoded reference signal on the first PRG. In this way, the network device can effectively determine, based on the reference signal transmitted on the first PRG, a corresponding precoding matrix for the second PRG used to transmit the PUSCH, and no additional signaling overhead is increased.

In one embodiment, before operation 360, the method further includes: sending, by the network device, the resource configuration information, where the resource configuration information indicates a frequency band used to transmit the PUSCH, and the resource configuration information indicates the frequency domain resource in a frequency band used by the terminal device to transmit the at least one reference signal.

Because the resource configuration information of the transmission resource of the PUSCH that is configured for the terminal device indicates, based on the frequency band that can be used by the terminal device to transmit the reference signal, the frequency band used to transmit the PUSCH, instead of indicating, based on the entire system bandwidth, the frequency band used to transmit the PUSCH, thereby saving signaling overheads.

It should be understood that in this embodiment of this application, the first PRG is a PRG used to transmit a reference signal, and the second PRG is a PRG used to transmit a PUSCH. Reference signals transmitted in each first PRG use a same group of precoding matrixes, namely, a precoding matrix corresponding to the first PRG. The precoding matrix does not change with the frequency in a frequency range corresponding to the first PRG.

In operation 310 to operation 360, there may be two cases of a relationship between the size of the first PRG and the size of the second PRG, and the following separately describes the two cases.

Case 1:

In one embodiment, the size of the first PRG is equal to a size of n second PRGs.

The n second PRGs corresponding to the first PRG include the second PRG in the foregoing operation 310 to operation 330, where n is a positive integer.

In other words, the size of the first PRG is equal to n times the size of the second PRG, and each first PRG is corresponding to n second PRGs in frequency domain. In other words, a frequency band occupied by one first PRG is the same as a frequency band occupied by the n second PRGs.

Therefore, because the size of the first PRG is equal to an integer multiple of the size of the second PRG, precoding matrixes used to transmit the PUSCH on all PRBs in the second PRG may be selected from a same group of precoding matrixes (that is, precoding matrixes used for reference signals transmitted on the first PRG) without a requirement of signaling re-indication.

However, in the prior art, precoding matrixes used to transmit PUSCHs on different PRBs in one second PRG may be separately selected from several different groups of precoding matrixes (precoding matrixes used for reference signals transmitted on different first PRGs), and therefore, subsequently, other signaling is further required for indication, so that the precoding matrixes used to transmit the PUSCHs on all the PRBs in the second PRG are the same.

In one embodiment, if the reference signal resource corresponding to the second PRG is the same as a reference signal resource corresponding to an adjacent second PRG of the second PRG in n second PRGs whose frequency domain positions are the same as that of the first PRG, and the second PRG is a second PRG whose PRG number is minimum or maximum in the n second PRGs, the reference signal resource indication information received by the terminal device in operation 320 is further used to indicate the reference signal resource corresponding to the adjacent second PRG.

Therefore, the network device only needs to indicate a reference signal resource corresponding to a second PRG whose PRG number is minimum, and the reference signal resource corresponding to the adjacent second PRG of the second PRG in the n second PRGs may not be indicated. In other words, the reference signal resource indication information used to indicate the reference signal resource corresponding to the adjacent second PRG may be omitted, thereby saving signaling overheads. Certainly, only a reference signal resource corresponding to a second PRG whose PRG number is maximum may be alternatively indicated, and a reference signal resource corresponding to another second PRG whose PRG number is relatively small may be omitted. This is not limited herein.

Figure 4:
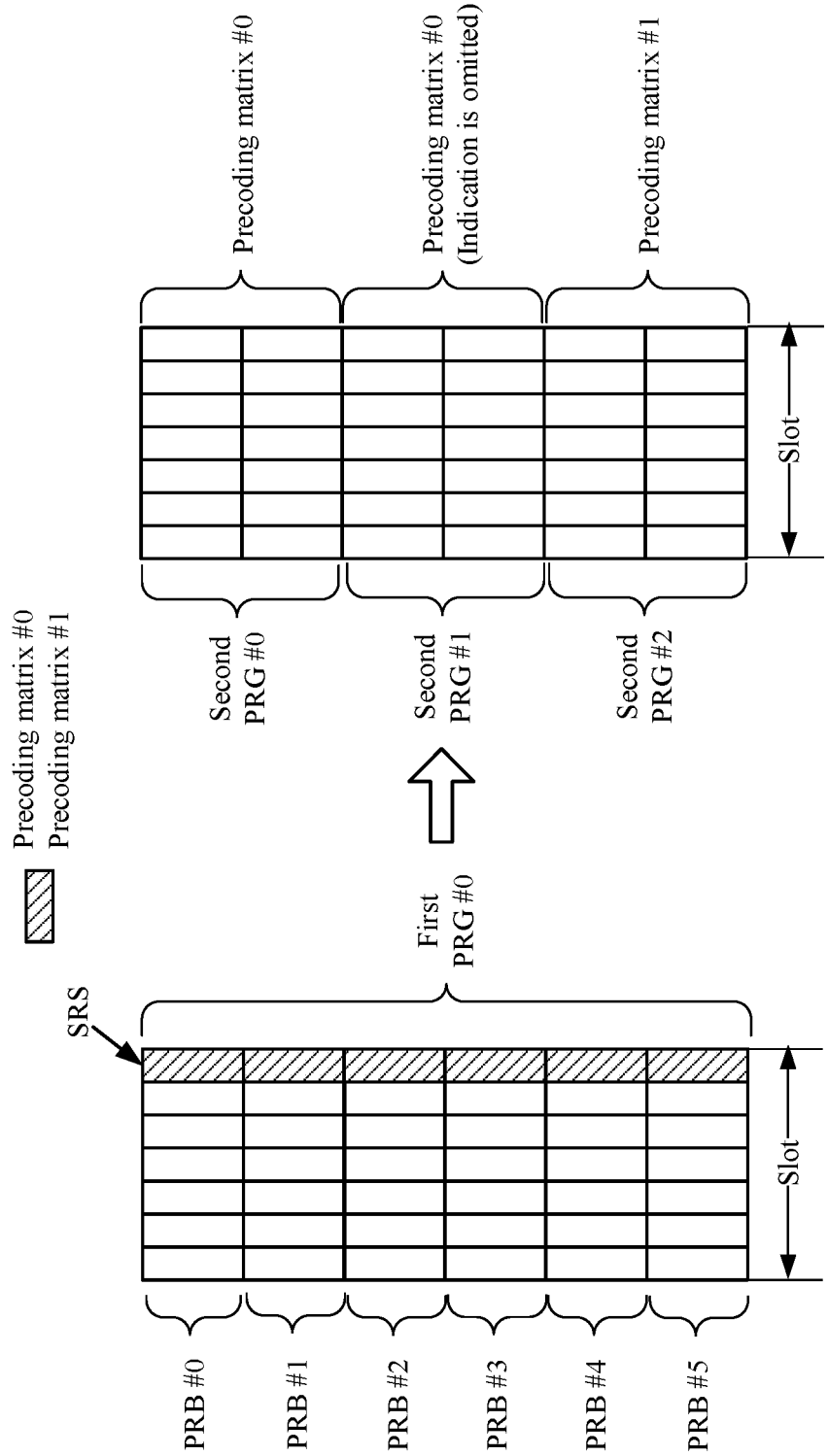
FIG. 4 is a schematic diagram of a resource for transmitting an SRS according to an embodiment of this application.

For example, FIG. 4 is a schematic diagram of a resource for transmitting an SRS. The size of the first PRG is equal to a size (n=2) of three second PRGs, and the first PRG #0 is corresponding to a second PRG #0, a second PRG #1, and a second PRG #2 in frequency domain. The terminal device sends, on the first PRG, an SRS that is encoded by using the precoding matrix #0 and the precoding matrix #1. It is assumed that a reference signal resource that is corresponding to the second PRG #0 and that is determined by the network device for the second PRG #0 is a reference signal resource used to transmit an SRS encoded by using the precoding matrix #0; a reference signal resource that is corresponding to the second PRG #1 and that is determined by the network device for the second PRG #1 is also the reference signal resource used to transmit the SRS encoded by using the precoding matrix #0; and a reference signal resource that is corresponding to the second PRG #2 and that is determined by the network device for the second PRG #2 is a reference signal resource used to transmit an SRS encoded by using the precoding matrix #1. Because the second PRG #0 has a smaller number in the second PRG #0 and the second PRG #1, the network device may send, to the terminal device, the reference signal resource indication information specific to the second PRG #1, to indicate a same reference signal resource corresponding to the second PRG #0 and the second PRG #1.

It should be understood that, in this embodiment, that the n second PRGs correspond to the first PRG means that the n second PRGs and the first PRG occupy a same frequency band. For example, as shown in FIG. 4, reference signals transmitted on the PRB #0 to the PRB #5 are precoded by using the precoding matrix #0 and the precoding matrix #1 that are corresponding to the first PRG. Similarly, in PUSCHs transmitted on the PRB #0 to the PRB #5, a precoding matrix used for the PUSCHs transmitted on the PRB #0 to the PRB #3 is the precoding matrix #0, and a precoding matrix used for the PUSCHs transmitted on the PRB #4 to the PRB #5 is the precoding matrix #1.

Case 2:

In one embodiment, the size of the second PRG is equal to a size of m first PRGs.

The m first PRGs corresponding to the second PRG include the first PRG in the foregoing operation 310 to operation 330, and m is a positive integer.

In other words, the size of the second PRG is equal to m times the size of the first PRG, and each second PRG is corresponding to m first PRGs in frequency domain. The reference signal resource corresponding to the second PRG may be one of at least one reference signal resource corresponding to a specific first PRG in the m first RPGs.

In one embodiment, the first PRG in operation 310 to operation 330 is a first PRG whose PRG number is minimum or maximum in the m first PRGs corresponding to the second PRG.

To be specific, the reference signal resource corresponding to the second PRG is a reference signal resource in the at least one reference signal resource corresponding to the first PRG whose PRG number is minimum or maximum in the m first PRGs, and m is a positive integer.

Specifically, in the m first PRGs corresponding to the second PRG, the at least one reference signal resource corresponding to a first PRG whose PRG number is minimum may be used to determine the reference signal resource corresponding to the second PRG. To be specific, the reference signal resource corresponding to the second PRG is determined from the at least one reference signal resource corresponding to the first PRG whose PRG number is minimum.

Figure 5:
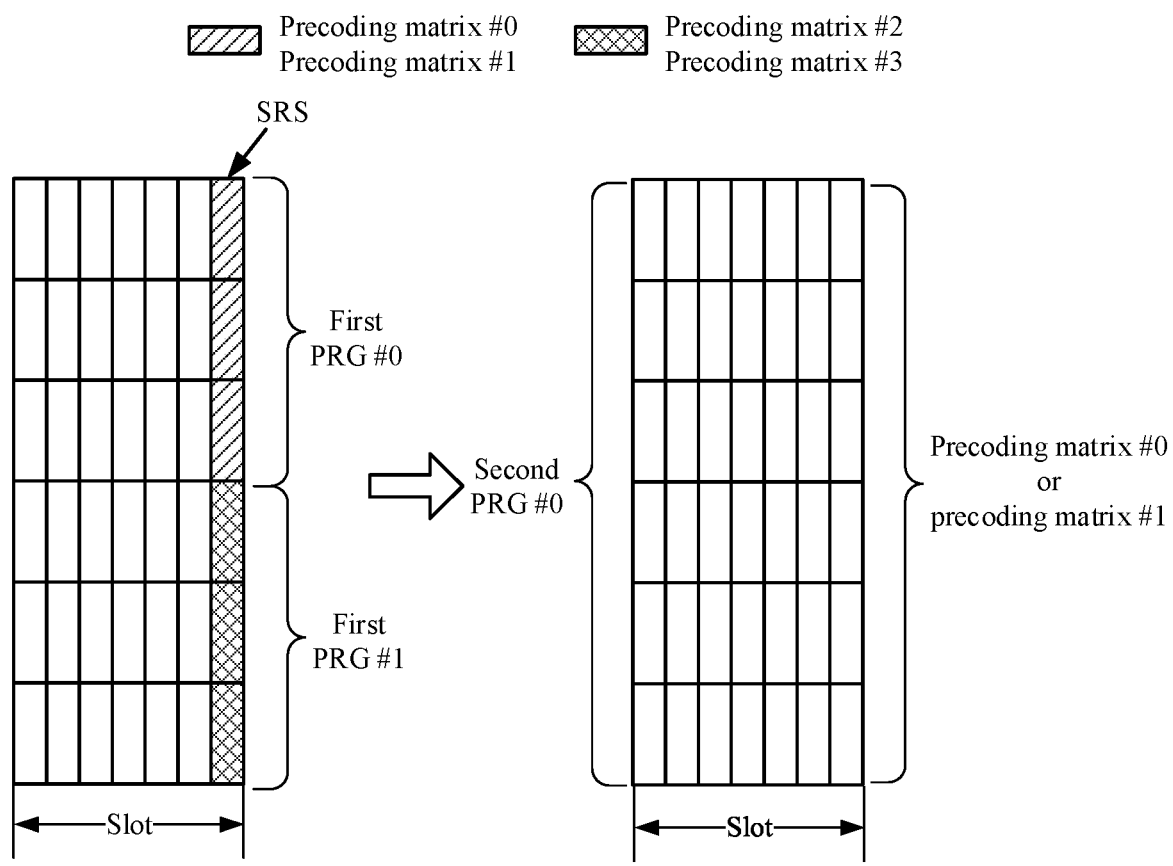
FIG. 5 is a schematic diagram of a resource for transmitting an SRS according to an embodiment of this application.

For example, FIG. 5 is a schematic diagram of a resource for transmitting an SRS. The size of the second PRG is equal to a size of two first PRGs (m=2), and the second PRG #0 is corresponding to the first PRG #0, the first PRG #1, and the first PRG #3 in frequency domain. The terminal device sends, on the first PRG #0, an SRS that is encoded by using the precoding matrix #0 and the precoding matrix #1, sends, on the first PRG #1, an SRS that is encoded by using the precoding matrix #2 and the precoding matrix #3, and sends, on the first PRG #2, an SRS that is encoded by using the precoding matrix #4 and the precoding matrix #5. When determining the reference signal resource corresponding to the second PRG #0, the network device first selects the first PRG whose resource number is minimum (the first PRG #0 herein) from the first PRG #0, the first PRG #1, and the first PRG #3, and then selects, from at least one reference signal resource corresponding to the first PRG #0, a reference signal resource corresponding to the second PRG #0. In other words, a precoding matrix used for an SRS transmitted on the reference signal resource corresponding to the second PRG #0 is one of the precoding matrix #0 and the precoding matrix #1.

It should be understood that, in this embodiment, that the m first PRGs correspond to the second PRG means that the m first PRGs and the second PRG occupy a same frequency band.

Figure 6:
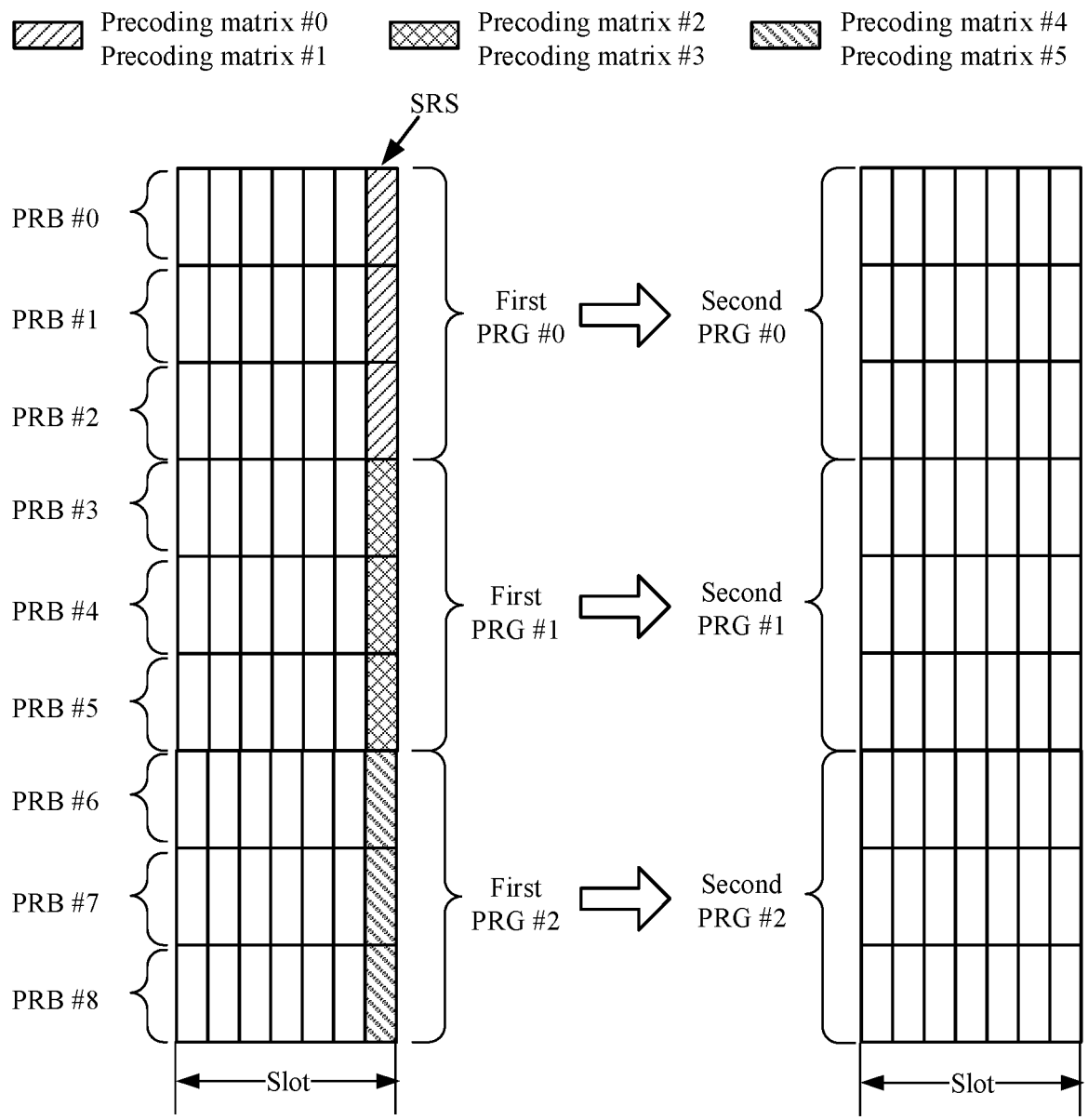
FIG. 6 is a schematic diagram of a resource for transmitting an SRS according to an embodiment of this application.

For case 1 and case 2 described above, there is a special case. To be specific, the size of the first PRG is the same as the size of the second PRG, and one first PRG is corresponding to one second PRG in frequency domain. For example, FIG. 6 is a schematic diagram of a resource for transmitting an SRS. FIG. 6 shows three first PRGs in a slot. Bandwidth of each first PRG is equal to a size of one second PRG, and each first PRG includes three PRBs. All SRSs transmitted on the first PRG #0 are precoded by using the precoding matrix #0 and the precoding matrix #1. All SRSs transmitted on the first PRG #1 are precoded by using the precoding matrix #2 and the precoding matrix #3, and all SRSs transmitted on the first PRG #2 are precoded by using the precoding matrix #4 and the precoding matrix #5.

For the first PRG #0, the terminal device respectively precodes two SRSs by using the precoding matrix #0 and the precoding matrix #1, and sends two precoded SRSs on the first PRG #0. After receiving the two SRSs, the network device measures the two SRSs, and selects, from the precoding matrixes used for the two SRSs, a precoding matrix that best matches the second PRG #0, to indicate, to the terminal device by using an SRI, a number of an SRS resource (namely, an SRS resource used for an SRS corresponding to the precoding matrix) corresponding to the second PRG #0, so that the terminal device precodes, based on the precoding matrix corresponding to the SRS that uses the SRS resource, a to-be-sent PUSCH on the second PRG #0.

Likewise, for the first PRG #1, the terminal device respectively precodes the two SRSs by using the precoding matrix #2 and the precoding matrix #3, and sends two precoded SRSs on the first PRG #1. After receiving the two SRSs, the network device measures the two SRSs, and selects, from the precoding matrixes used for the two SRSs, a precoding matrix that best matches the second PRG #1, to indicate, to the terminal device by using an SRI, a number of an SRS resource (namely, an SRS resource used for an SRS corresponding to the precoding matrix) corresponding to the second PRG #0, so that the terminal device precodes, based on the precoding matrix corresponding to the SRS that uses the SRS resource, a to-be-sent PUSCH on the second PRG #1.

Likewise, for the first PRG #2, the terminal device respectively precodes the two SRSs by using the precoding matrix #4 and the precoding matrix #5, and sends the two precoded SRSs on the first PRG #2. After receiving the two SRSs, the network device measures the two SRSs, and selects, from the precoding matrixes used for the two SRSs, a precoding matrix that best matches the second PRG #0, to indicate, to the terminal device by using an SRI, a number of an SRS resource (namely, an SRS resource used for an SRS corresponding to the precoding matrix) corresponding to the second PRG #0, so that the terminal device precodes, based on the precoding matrix corresponding to the SRS that uses the SRS resource, a to-be-sent PUSCH on the second PRG #2.

It should be understood that the precoding matrixes used when a same reference signal is transmitted on the first PRG #0, the first PRG #1, and the first PRG #2 may be different.

In FIG. 6, bandwidth of each first PRG is equal to bandwidth of a second PRG. Therefore, precoding matrixes used for SRSs transmitted on different PRBs in each second PRG are the same, and the network device only needs to select a corresponding precoding matrix for the second PRG #0 from the precoding matrix #0 and the precoding matrix #1 to transmit the PUSCH, select a corresponding precoding matrix for the second PRG #1 from the precoding matrix #2 and the precoding matrix #3 to transmit the uplink data, and select a corresponding precoding matrix for the second PRG #2 from the precoding matrix #4 and the precoding matrix #5 to transmit the uplink data. Precoding matrixes used for PUSCHs transmitted on all PRBs in a second PRG are the same. Therefore, the network device can effectively select a proper precoding matrix for data transmitted on different second PRGs.

In one embodiment, the reference signal sent by the terminal device on the first PRG may occupy all PRBs in the first PRG, or occupy some PRBs in the first PRG. For example, the PRBs are distributed in the first PRG with a specific density.

A relationship between the size of the RBG and the size of the first PRG or the second PRG may be shown in the foregoing Table 2.

For example, FIG. 6 is a schematic diagram of a resource for transmitting an SRS. The first PRG #0 includes a PRB #0, a PRB #1, and a PRB #2, and on a last symbol of the slot, the SRS is transmitted on the PRB #0, the PRB #1, and the PRB #2 in the first PRG #0. The SRS transmitted on the first PRG #0 is precoded by using the precoding matrix #0 and the precoding matrix #1.

Figure 7:
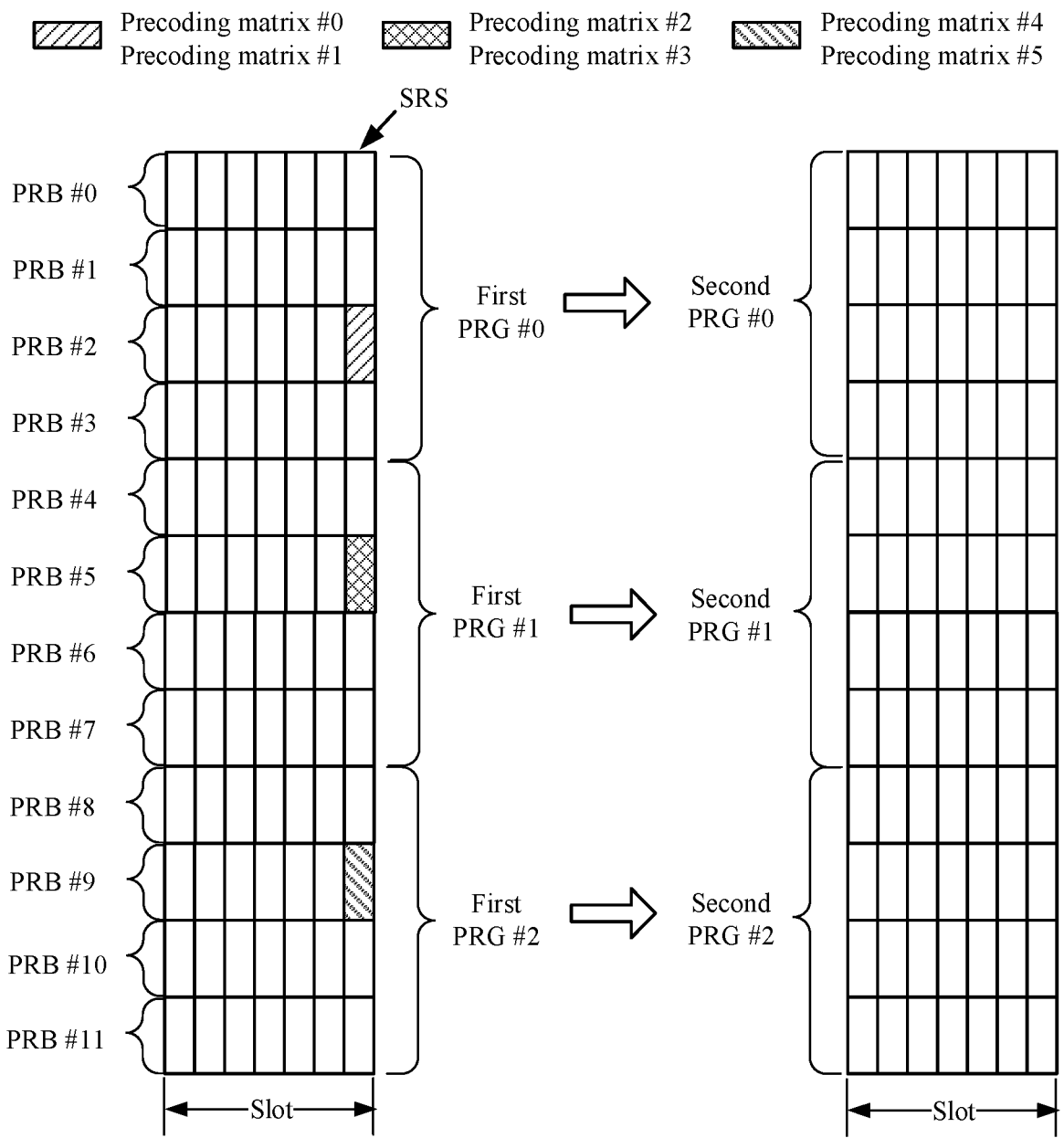
FIG. 7 is a schematic flowchart of SRS transmission according to an embodiment of this application.

For another example, FIG. 7 is a schematic diagram of a resource for transmitting an SRS. FIG. 7 shows three first PRGs in a slot. Bandwidth of each first PRG is equal to a size of one second PRG, each first PRG includes four PRBs, and density of the SRS in frequency domain is ¼. The first PRG #0 includes the PRB #0, the PRB #1, the PRB #2, and the PRB #3, and on the last symbol of the slot, in the PRB #0, the PRB #1, the PRB #2, and the PRB #3, the SRS is transmitted only on one PRB, namely, the PRB #2. The first PRG #1 includes the PRB #4, the PRB #5, the PRB #6, and the PRB #7, and the SRS is transmitted only on one PRB, namely, the PRB #5. The first PRG #2 includes the PRB #8, the PRB #9, the PRB #10, and the PRB #11, and the SRS is transmitted only on one PRB, namely, the PRB #9.

In one embodiment, a frequency domain start/end position of the first PRG is the same as a frequency domain start/end position of the n second PRGs.

Further, in one embodiment, the frequency domain start/end position of the first PRG is the same as the frequency domain start/end position of a resource block group RBG, and the frequency domain start/end position of the second PRG is the same as the frequency domain start/end position of the RBG.

In other words, if the frequency band that is used to transmit the reference signal and that is in the system bandwidth includes P first PRGs, and the system bandwidth includes Q second PRGs used to transmit the PUSCH, a frequency domain start/end position of the P first PRGs is the same as a frequency domain start/end position of the Q second PRGs, and the frequency band occupied by the P first PRGs may be the same as a frequency band occupied by the Q second PRGs.

In one embodiment, the first PRG includes an entire frequency band that can be used by the terminal device to transmit the at least one reference signal.

To be specific, the bandwidth that can be used to transmit the at least one reference signal includes only one first PRG, and in the first PRG, namely, the entire frequency band that can be used to transmit the reference signal, the precoding matrix used for the reference signal does not change with the frequency. The terminal device precodes the at least one reference signal by using at least one precoding matrix in the entire bandwidth used to transmit the reference signal, and sends the at least one reference signal to the network device on at least one reference signal resource. After receiving and measuring the reference signal, the network device separately indicates, to the terminal device, a reference signal resource corresponding to each second PRG. The reference signal resource corresponding to each second PRG may be different from a reference signal resource corresponding to another second PRG. However, the reference signal resource corresponding to each second PRG is one of the at least one reference signal resource.

Figure 8:
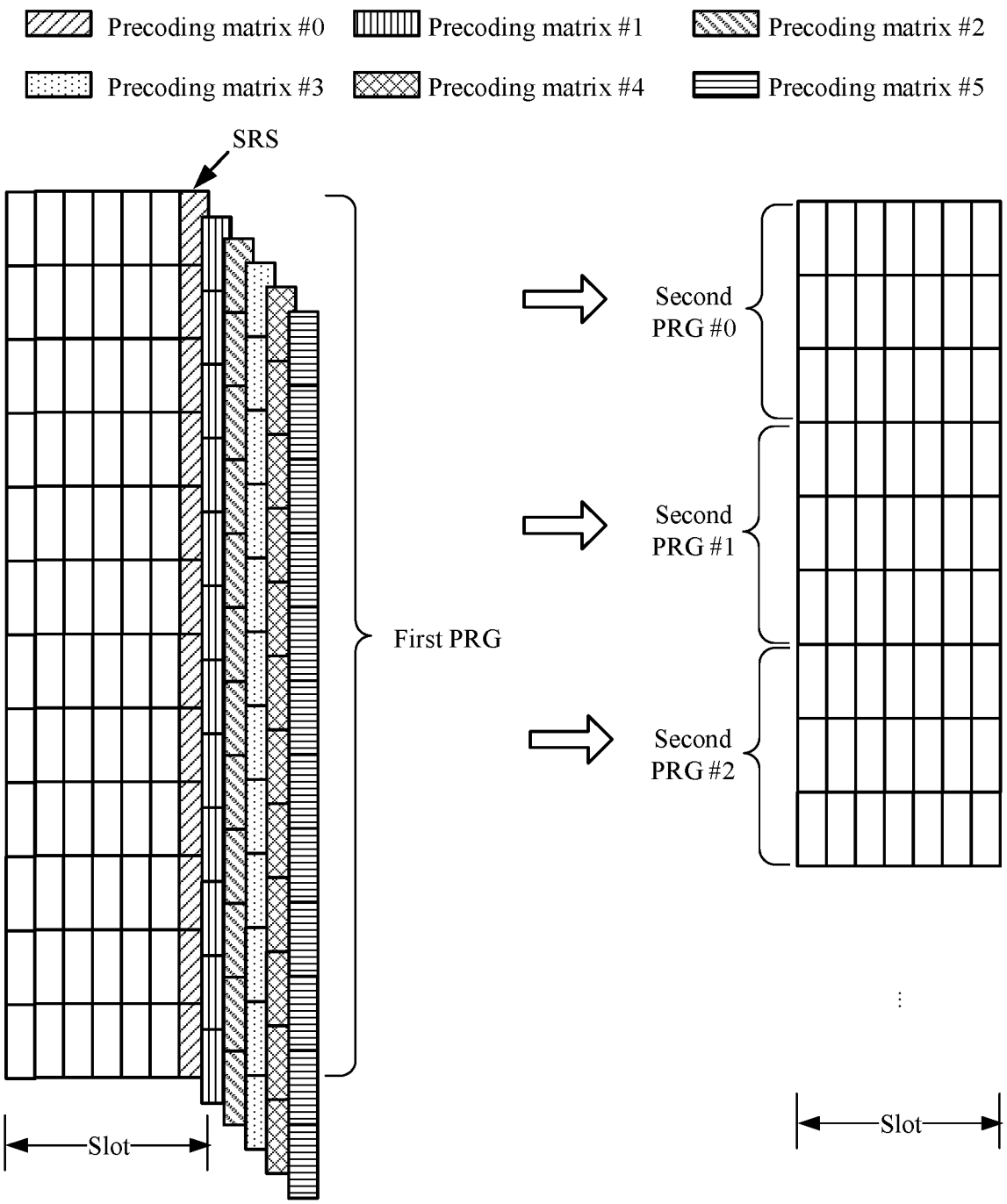
FIG. 8 is a schematic flowchart of SRS transmission according to an embodiment of this application.

For example, FIG. 8 is a schematic diagram of a resource for transmitting an SRS. The first PRG includes an entire frequency band used by the terminal device to transmit the reference signal, and the terminal device sends, to the network device on the reference signal resource corresponding to the first PRG, six SRSs that are precoded by using six precoding matrixes: the precoding matrix #0 to the precoding matrix #5. The six SRSs respectively use different SRS resources, and the reference signal resources corresponding to the second PRG #0, the second PRG #1, the second PRG #2, and another second precoding matrix are selected from the six reference signal resources. Each of corresponding precoding matrixes used for PUSCHs sent by the terminal device on the second PRG #0, the second PRG #1, and the second PRG #2 is one of the precoding matrix #0 to the precoding matrix #5.

In one embodiment, the terminal device sends the at least one reference signal by using a plurality of reference signal processes (referred to as "processes" below). In the plurality of reference signal processes, a size of a first PRG in each reference signal process is the same as or different from a size of a first PRG in another reference signal process.

The reference signal resource corresponding to the second PRG is at least one of the at least one reference signal resource corresponding to the first PRG of a reference signal process selected from the plurality of reference signal processes.

Herein, the reference signal process corresponds to a higher layer signaling field, and the reference signal process includes one or more groups of configuration parameters of reference signals. Each group of configuration parameters corresponds to one reference signal, and a configuration of the reference signal process is indicated by the network device to the terminal device by using RRC. It may be considered that reference signals included in each reference signal process are sent by using a specific antenna group or an antenna panel. The configuration parameter may be, for example, at least one of the configuration parameters shown in Table 1.

Figure 9:
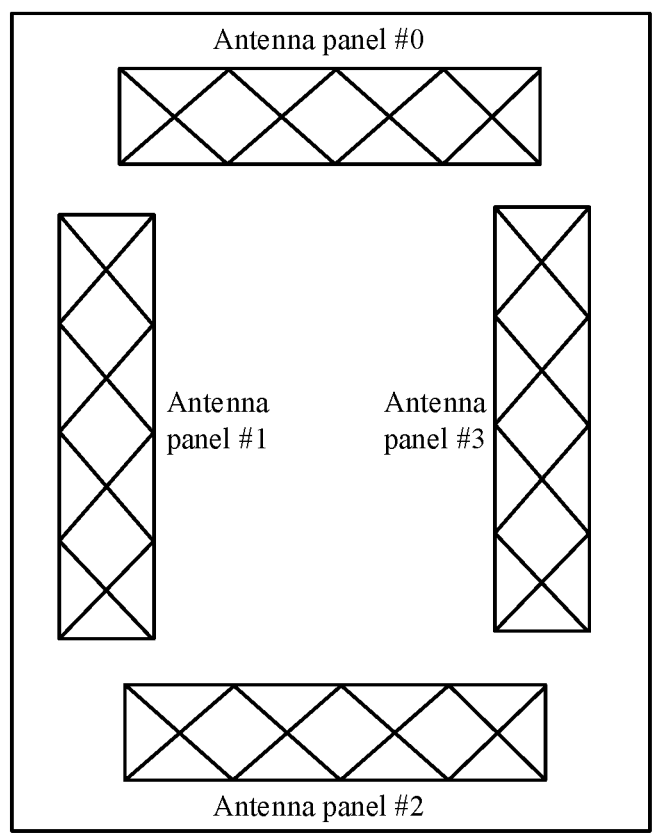
FIG. 9 is a schematic flowchart of SRS transmission according to an embodiment of this application.
Figure 10:
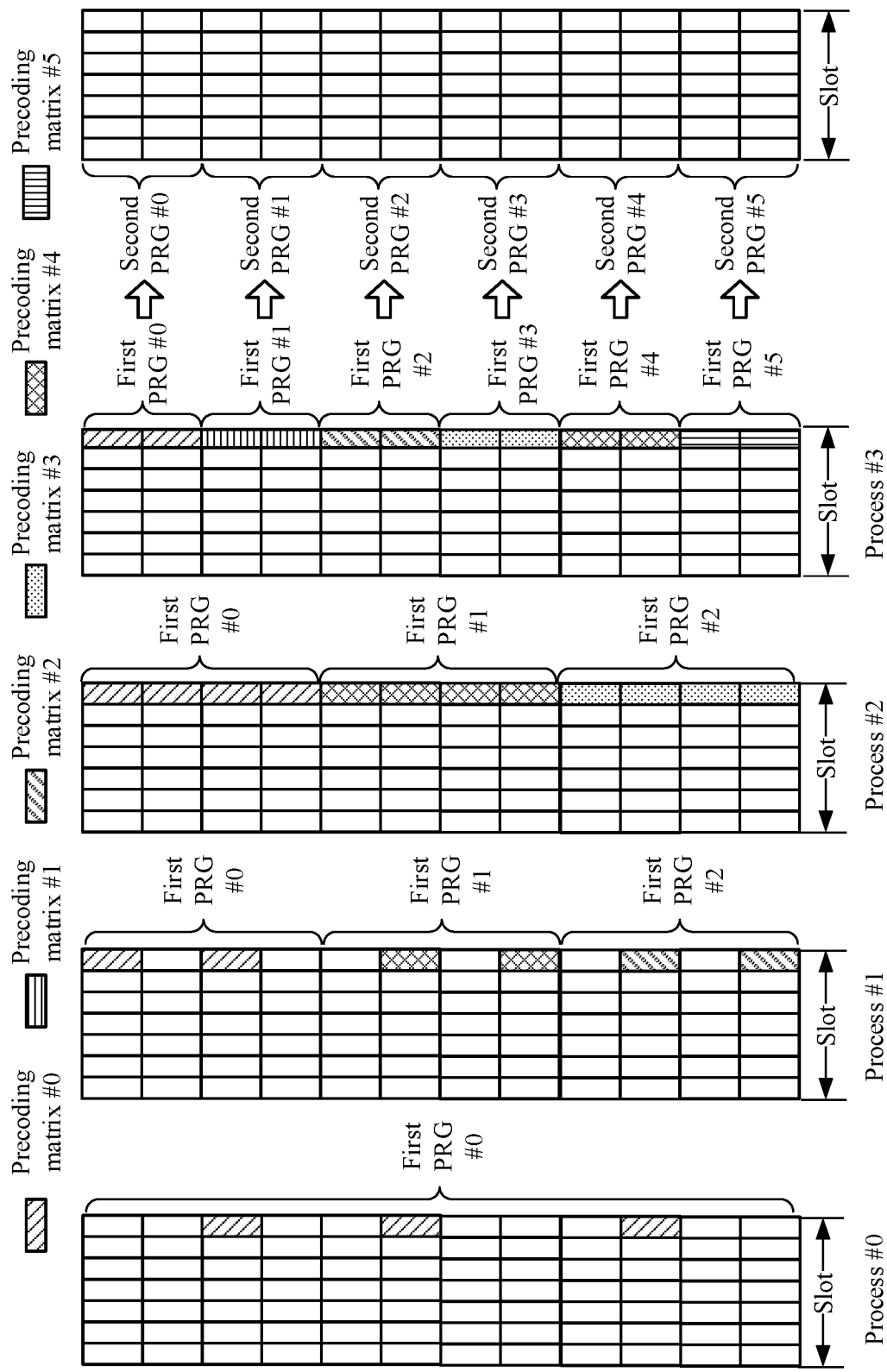
FIG. 10 is a schematic flowchart of SRS transmission according to an embodiment of this application.

For example, FIG. 9 is a schematic diagram of a plurality of reference signal processes. The terminal device may send reference signals to the network device by using four antenna panels, namely, four reference signal processes. Sizes of first PRGs used to transmit reference signals in reference signal processes may not be all the same, and different density may be also used to transmit SRSs. For example, as shown in FIG. 10, a first PRG in a process #0 includes 12 PRBs, a first PRG in a process #1 includes four PRBs, the first PRG in a process #2 includes four PRBs, and the first PRG in a process #3 includes two PRBs.

The network device may select one or more of the plurality of reference signal processes based on a current channel state or another factor. For example, if the channel state sharply changes, the network device may select a relatively small first PRG from the first PRGs of the plurality of processes. As shown in FIG. 10, the network device selects the first PRG #0 whose frequency domain position is the same as that of the second PRG and that is in the process #3. The precoding matrix used for the SRS transmitted on the reference signal resource corresponding to the second PRG #0 may be the precoding matrix #0 corresponding to the first PRG #0 of the process #3. The precoding matrix used for the SRS transmitted on the reference signal resource corresponding to the second PRG #1 may be the precoding matrix #1 corresponding to the first PRG #1 of the process #3. The precoding matrix used for the SRS transmitted on the reference signal resource corresponding to the second PRG #2 may be the precoding matrix #2 corresponding to the first PRG #2 of the process #3. The precoding matrix used for the SRS transmitted on the reference signal resource corresponding to the second PRG #3 may be the precoding matrix #3 corresponding to the first PRG #3 of the process #3. The precoding matrix used for the SRS transmitted on the reference signal resource corresponding to the second PRG #4 may be the precoding matrix #4 corresponding to the first PRG #4 of the process #3. The precoding matrix used for the SRS transmitted on the reference signal resource corresponding to the second PRG #5 may be the precoding matrix #5 corresponding to the first PRG #5 of the process #3.

If the channel state is stable, the network device may select a relatively large first PRG from first PRGs of the plurality of processes. As shown in FIG. 10, the network device selects the first PRG #0 of the process #0. The precoding matrixes used for the SRSs transmitted on the reference signal resources respectively corresponding to the second PRG #0 to the second PRG #5 are all the precoding matrix #0 corresponding to the first PRG #0 of the process #0.

It should be understood that, in this embodiment, for a process of transmitting the reference signal and the PUSCH in each of the plurality of processes, refer to the process of transmitting the reference signal and the PUSCH in any one of the foregoing embodiments. In other words, descriptions of operation 310 to operation 360 may be independently applied to each process for transmitting a reference signal and a PUSCH.

It should be further understood that sequence numbers of the foregoing processes do not mean execution sequences in various embodiments of this application. The execution sequences of the processes should be determined according to functions and internal logic of the processes, and should not constitute any limitation on the implementation processes of the embodiments of this application.

Figure 11:
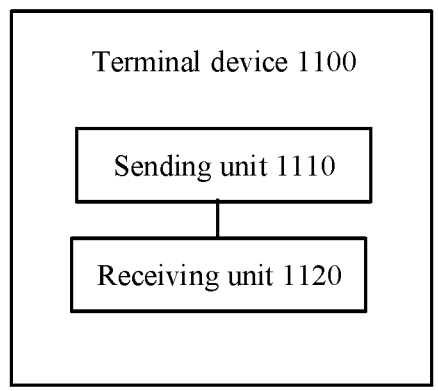
FIG. 11 is a schematic block diagram of a terminal device according to an embodiment of this application.

FIG. 11 is a schematic block diagram of a terminal device 1100 according to an embodiment of this application. As shown in FIG. 11, the terminal device 1100 includes a sending unit 1110 and a receiving unit 1120.

The sending unit 1110 is configured to separately send at least one precoded reference signal on at least one reference signal resource corresponding to a first precoding resource block group PRG, where different reference signals in the at least one reference signal are precoded by using different precoding matrixes, the first PRG is a PRG of the reference signal, and the reference signal includes a sounding reference signal SRS.

The receiving unit 1120 is configured to receive reference signal resource indication information, where the reference signal resource indication information is used to indicate a reference signal resource corresponding to a second PRG, and the reference signal resource corresponding to the second PRG is at least one reference signal resource selected from the at least one reference signal resource corresponding to the first PRG whose frequency domain position is the same as that of the second PRG, and the second PRG is a PRG of a physical uplink shared channel PUSCH.

The sending unit 1110 is further configured to send a precoded PUSCH on the second PRG based on the reference signal resource indication information, where a precoding matrix used for the PUSCH is determined based on a precoding matrix used for a reference signal sent on the reference signal resource corresponding to the second PRG.

Therefore, in this embodiment of this application, a plurality of first PRGs used to transmit reference signals are set, and the terminal device sends, on the first PRG, a reference signal that is precoded by using a corresponding precoding matrix, so that a network device can effectively select, based on the reference signal transmitted on the first PRG, the precoding matrix used to transmit the PUSCH on the second PRG corresponding to the first PRG.

In one embodiment, at least a part of at least one precoding matrix used for the at least one reference signal sent on the first PRG is different from at least one precoding matrix used for at least one reference signal sent on another first PRG, the another first PRG is a first PRG that is in a plurality of first PRGs and whose frequency domain position is different from that of the first PRG, where a plurality of reference signal resources corresponding to a plurality of second PRGs of the PUSCH are at least one reference signal resource selected from a plurality of reference signal resources corresponding to the plurality of first PRGs whose frequency domain positions are the same as frequency domain positions of the plurality of second PRGs.

In one embodiment, the size of the first PRG is equal to a size of n second PRGs, and n is a positive integer.

In one embodiment, if the reference signal resource corresponding to the second PRG is the same as a reference signal resource corresponding to an adjacent second PRG of the second PRG in the n second PRGs corresponding to the first PRG, and the second PRG is a second PRG whose PRG number is minimum or maximum in the n second PRGs, the reference signal resource indication information is further used to indicate the reference signal resource corresponding to the adjacent second PRG.

In one embodiment, the size of the second PRG is equal to a size of m first PRGs.

In one embodiment, the first PRG is a first PRG whose PRG number is minimum or maximum in the m first PRGs corresponding to the second PRG, and the reference signal resource corresponding to the second PRG is a reference signal resource in the at least one reference signal resource corresponding to the first PRG whose PRG number is minimum or maximum in the m first PRGs, where m is a positive integer.

In one embodiment, a frequency domain start/end position of the first PRG is the same as a frequency domain start/end position of the n second PRGs.

In one embodiment, the frequency domain start/end position of the first PRG is the same as the frequency domain start/end position of a resource block group RBG of the terminal device, and the frequency domain start/end position of the second PRG is the same as the frequency domain start/end position of the RBG of the terminal device.

In one embodiment, the first PRG includes an entire frequency band used by the terminal device to transmit the at least one reference signal.

In one embodiment, the receiving unit 1120 is further configured to: before the sending unit 1110 sends the precoded PUSCH on the second PRG, receive resource configuration information, where the resource configuration information indicates a frequency domain resource used to transmit the PUSCH, and the resource configuration information indicates the frequency domain resource in a frequency band used by the terminal device to transmit the at least one reference signal.

In one embodiment, the receiving unit 1120 is further configured to: before the sending unit 1110 sends the at least one precoded reference signal on the at least one reference signal resource corresponding to the first PRG, receive first indication information carried in higher layer signaling or downlink control information DCI, where the first indication information is used to indicate at least one of the following:

the size of the first PRG, the size of the second PRG, and a relationship indicating that the size of the first PRG is k times the size of the second PRG.

In one embodiment, the terminal device sends the reference signal by using a plurality of reference signal processes, and in the plurality of reference signal processes, a size of a first PRG in each reference signal process is the same as or different from a size of a first PRG in another reference signal process, and the reference signal resource corresponding to the second PRG is at least one of at least one reference signal resource corresponding to the first PRG that is of a reference signal process selected from the plurality of reference signal processes and that is indicated by using signaling.

In one embodiment, the reference signal includes the sounding reference signal SRS.

Figure 12:
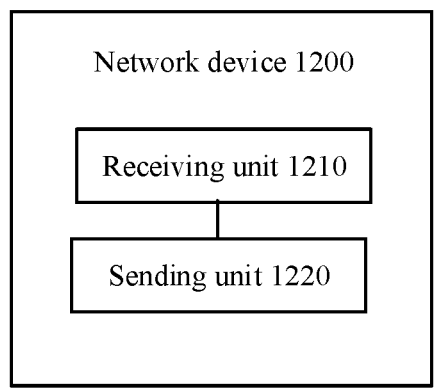
FIG. 12 is a schematic block diagram of a network device according to an embodiment of this application.

FIG. 12 is a schematic block diagram of a network device 1200 according to an embodiment of this application. As shown in FIG. 12, the network device 1200 includes a receiving unit 1210 and a sending unit 1220.

The receiving unit 1210 is configured to separately receive at least one precoded reference signal on at least one reference signal resource corresponding to a first precoding resource block group PRG, where different reference signals in the at least one reference signal are precoded by using different precoding matrixes, the first PRG is a PRG of the reference signal, and the reference signal includes a sounding reference signal SRS.

The sending unit 1220 is configured to send reference signal resource indication information, where the reference signal resource indication information is used to indicate a reference signal resource corresponding to a second PRG, and the reference signal resource corresponding to the second PRG is at least one reference signal resource selected from the at least one reference signal resource corresponding to the first PRG whose frequency domain position is the same as that of the second PRG, and the second PRG is a PRG of a physical uplink shared channel PUSCH.

The receiving unit 1210 is further configured to receive a precoded PUSCH on the second PRG, where a precoding matrix used for the PUSCH is determined based on a precoding matrix used for a reference signal sent on the reference signal resource corresponding to the second PRG.

Therefore, in this embodiment of this application, a plurality of first PRGs used to transmit reference signals are set, and the terminal device sends, on the first PRG, a reference signal that is precoded by using a corresponding precoding matrix, so that a network device can effectively select, based on the reference signal transmitted on the first PRG, the precoding matrix used to transmit the PUSCH on the second PRG corresponding to the first PRG.

In one embodiment, at least a part of at least one precoding matrix used for the at least one reference signal sent on the first PRG is different from at least one precoding matrix used for at least one reference signal sent on another first PRG, the another first PRG is a first PRG that is in a plurality of first PRGs and whose frequency domain position is different from that of the first PRG, where a plurality of reference signal resources corresponding to a plurality of second PRGs of the PUSCH are at least one reference signal resource selected from a plurality of reference signal resources corresponding to the plurality of first PRGs whose frequency domain positions are the same as frequency domain positions of the plurality of second PRGs.

In one embodiment, the size of the first PRG is equal to a size of n second PRGs, and n is a positive integer.

In one embodiment, if the reference signal resource corresponding to the second PRG is the same as a reference signal resource corresponding to an adjacent second PRG of the second PRG in the n second PRGs corresponding to the first PRG, and the second PRG is a second PRG whose PRG number is minimum or maximum in the n second PRGs, the reference signal resource indication information is further used to indicate the reference signal resource corresponding to the adjacent second PRG.

In one embodiment, the size of the second PRG is equal to a size of m first PRGs.

In one embodiment, the first PRG is a first PRG whose PRG number is minimum or maximum in the m first PRGs corresponding to the second PRG, and the reference signal resource corresponding to the second PRG is a reference signal resource in the at least one reference signal resource corresponding to the first PRG whose PRG number is minimum or maximum in the m first PRGs, where m is a positive integer.

In one embodiment, a frequency domain start/end position of the first PRG is the same as a frequency domain start/end position of the n second PRGs.

In one embodiment, the frequency domain start/end position of the first PRG is the same as the frequency domain start/end position of a resource block group RBG of the terminal device, and the frequency domain start/end position of the second PRG is the same as the frequency domain start/end position of the RBG of the terminal device.

In one embodiment, the first PRG includes an entire frequency band that is used by the network device to receive the reference signal.

In one embodiment, the sending unit 1220 is further configured to: before the receiving unit 1210 receives the precoded PUSCH on the second PRG, send resource configuration information, where the resource configuration information indicates a frequency domain resource used to transmit the PUSCH, and the resource configuration information indicates the frequency domain resource in a frequency band used by the terminal device to transmit the at least one reference signal.

In one embodiment, the sending unit 1220 is further configured to: before the receiving unit 1210 receives the at least one precoded reference signal on the at least one reference signal resource corresponding to the first PRG, send first indication information carried in higher layer signaling or downlink control information DCI, where the first indication information is used to indicate at least one of the following:

the size of the first PRG, the size of the second PRG, and a relationship indicating that the size of the first PRG is k times the size of the second PRG.

In one embodiment, the network device receives the at least one reference signal in a plurality of reference signal processes, and the plurality of reference signal processes, a size of a first PRG in each reference signal process is the same as or different from a size of a first PRG in another reference signal process, and the reference signal resource corresponding to the second PRG is at least one of at least one reference signal resource corresponding to the first PRG that is of a reference signal process selected from the plurality of reference signal processes and that is indicated by using signaling.

In one embodiment, the reference signal includes the sounding reference signal SRS.

Figure 13:
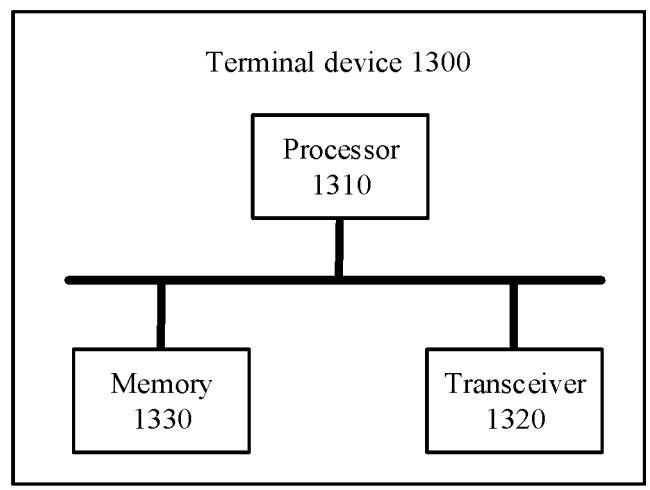
FIG. 13 is a schematic structural diagram of a terminal device according to an embodiment of this application.

FIG. 13 is a schematic structural diagram of a terminal device 1300 according to an embodiment of this application. As shown in FIG. 13, the terminal device includes a processor 1310, a transceiver 1320, and a memory 1330. The processor 1310, the transceiver 1320, and the memory 1330 communicate with each other over an internal connection path. The memory 1330 is configured to store an instruction, and the processor 1310 is configured to execute the instruction stored in the memory 1330, to control the transceiver 1320 to receive a signal or send a signal. The transceiver 1320 is configured to:

separately send at least one precoded reference signal on at least one reference signal resource corresponding to a first precoding resource block group PRG, where different reference signals in the at least one reference signal are precoded by using different precoding matrixes, the first PRG is a PRG of the reference signal, and the reference signal includes a sounding reference signal SRS;

receive reference signal resource indication information, where the reference signal resource indication information is used to indicate a reference signal resource corresponding to a second PRG, where the reference signal resource corresponding to the second PRG is at least one reference signal resource selected from the at least one reference signal resource corresponding to the first PRG whose frequency domain position is the same as that of the second PRG, the second PRG is a PRG of a physical uplink shared channel PUSCH, a size of the first PRG is equal to n times a size of the second PRG, and n is 1 or a positive integer greater than 1; and send a precoded PUSCH on the second PRG based on the reference signal resource indication information, where a precoding matrix used for the PUSCH is determined based on a precoding matrix used for the reference signal sent on the reference signal resource corresponding to the second PRG.

In one embodiment, at least a part of at least one precoding matrix used for the at least one reference signal sent on the first PRG is different from at least one precoding matrix used for at least one reference signal sent on another first PRG, the another first PRG is a first PRG that is in a plurality of first PRGs and whose frequency domain position is different from that of the first PRG, where a plurality of reference signal resources corresponding to a plurality of second PRGs of the PUSCH are at least one reference signal resource selected from a plurality of reference signal resources corresponding to the plurality of first PRGs whose frequency domain positions are the same as frequency domain positions of the plurality of second PRGs.

In one embodiment, the size of the first PRG is equal to a size of n second PRGs, and n is a positive integer.

In one embodiment, if the reference signal resource corresponding to the second PRG is the same as a reference signal resource corresponding to an adjacent second PRG of the second PRG in the n second PRGs corresponding to the first PRG, and the second PRG is a second PRG whose PRG number is minimum or maximum in the n second PRGs, the reference signal resource indication information is further used to indicate the reference signal resource corresponding to the adjacent second PRG.

In one embodiment, the size of the second PRG is equal to a size of m first PRGs.

In one embodiment, the first PRG is a first PRG whose PRG number is minimum or maximum in the m first PRGs corresponding to the second PRG, and the reference signal resource corresponding to the second PRG is a reference signal resource in the at least one reference signal resource corresponding to the first PRG whose PRG number is minimum or maximum in the m first PRGs, where m is a positive integer.

In one embodiment, a frequency domain start/end position of the first PRG is the same as a frequency domain start/end position of the n second PRGs.

In one embodiment, the frequency domain start/end position of the first PRG is the same as the frequency domain start/end position of a resource block group RBG of the terminal device, and the frequency domain start/end position of the second PRG is the same as the frequency domain start/end position of the RBG of the terminal device.

In one embodiment, the first PRG includes an entire frequency band used by the terminal device to transmit the at least one reference signal.

In one embodiment, the transceiver 1320 is further configured to: before sending the precoded PUSCH on the second PRG, receive resource configuration information, where the resource configuration information indicates a frequency domain resource used to transmit the PUSCH, and the resource configuration information indicates the frequency domain resource in a frequency band used by the terminal device to transmit the at least one reference signal.

In one embodiment, the transceiver 1320 is further configured to: before sending the at least one precoded reference signal on the at least one reference signal resource corresponding to the first PRG, receive first indication information carried in higher layer signaling or downlink control information DCI, where the first indication information is used to indicate at least one of the following:

the size of the first PRG, the size of the second PRG, and the relationship indicating that the size of the first PRG is k times the size of the second PRG.

In one embodiment, the terminal device sends the reference signal by using a plurality of reference signal processes. In the plurality of reference signal processes, a size of a first PRG in each reference signal process is the same as or different from a size of a first PRG in another reference signal process, and the reference signal resource corresponding to the second PRG is at least one of at least one reference signal resource corresponding to the first PRG that is of a reference signal process selected from the plurality of reference signal processes and that is indicated by using signaling.

In one embodiment, the reference signal includes the sounding reference signal SRS.

It should be understood that in this embodiment of this application, the processor 1310 may be a central processing unit (CPU), or the processor 1310 may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor or the like.

The memory 1330 may include a read-only memory and a random access memory, and provide an instruction and data to the processor 1310. A part of the memory 1330 may further include a non-volatile random access memory. For example, the memory 1330 may further store information about a device type.

In an implementation process, operations in the foregoing method may be implemented by using an integrated logical circuit of hardware in the processor 1310, or instructions in a form of software. The operations of the positioning method disclosed with reference to the embodiments of this application may be directly performed by a hardware processor, or may be performed by using a combination of hardware in the processor 1310 and a software module. The software module may be located in a mature storage medium in the art, such as a random access memory, a flash memory, a read-only memory, a programmable read-only memory, an electrically erasable programmable memory, or a register. The storage medium is located in the memory 1330, and the processor 1310 reads information from the memory 1330 and completes the operations in the foregoing methods in combination with the hardware of the processor. To avoid repetition, details are not described herein again.

The terminal device 1300 in this embodiment of this application may be corresponding to the terminal device configured to perform the method 300 in the foregoing method 300, and the terminal device 1100 in the embodiments of this application. In addition, units or modules in the terminal device 1300 are separately configured to perform the actions or processing processes performed by the terminal device in the foregoing method 300. Herein, to avoid repetition, detailed descriptions are omitted.

Figure 14:
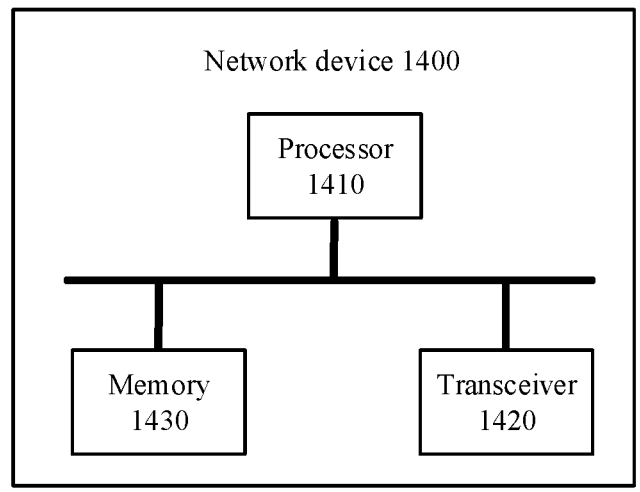
FIG. 14 is a schematic structural diagram of a network device according to an embodiment of this application.

FIG. 14 is a schematic structural diagram of a network device 1400 according to an embodiment of this application. As shown in FIG. 14, the network device includes a processor 1410, a transceiver 1420, and a memory 1430. The processor 1410, the transceiver 1420, and the memory 1430 communicate with each other over an internal connection path. The memory 1430 is configured to store an instruction, and the processor 1410 is configured to execute the instruction stored in the memory 1430, to control the transceiver 1420 to receive a signal or send a signal. The transceiver 1420 is configured to:

separately receive at least one precoded reference signal on at least one reference signal resource corresponding to a first precoding resource block group PRG, where different reference signals in the at least one reference signal are precoded by using different precoding matrixes, the first PRG is a PRG of the reference signal, and the reference signal includes a sounding reference signal SRS;

send reference signal resource indication information, where the reference signal resource indication information is used to indicate a reference signal resource corresponding to a second PRG, where the reference signal resource corresponding to the second PRG is at least one reference signal resource selected from the at least one reference signal resource corresponding to the first PRG whose frequency domain position is the same as that of the second PRG, and the second PRG is a PRG of a physical uplink shared channel PUSCH, and a size of the first PRG is equal to n times a size of the second PRG, where n is 1 or a positive integer greater than 1; and receive a precoded PUSCH on the second PRG, where a precoding matrix used for the PUSCH is determined based on a precoding matrix used for the reference signal sent on the reference signal resource corresponding to the second PRG.

In one embodiment, at least a part of at least one precoding matrix used for the at least one reference signal sent on the first PRG is different from at least one precoding matrix used for at least one reference signal sent on another first PRG, the another first PRG is a first PRG that is in a plurality of first PRGs and whose frequency domain position is different from that of the first PRG, where a plurality of reference signal resources corresponding to a plurality of second PRGs of the PUSCH are at least one reference signal resource selected from a plurality of reference signal resources corresponding to the plurality of first PRGs whose frequency domain positions are the same as frequency domain positions of the plurality of second PRGs.

In one embodiment, the size of the first PRG is equal to a size of n second PRGs, and n is a positive integer.

In one embodiment, if the reference signal resource corresponding to the second PRG is the same as a reference signal resource corresponding to an adjacent second PRG of the second PRG in the n second PRGs corresponding to the first PRG, and the second PRG is a second PRG whose PRG number is minimum or maximum in the n second PRGs, the reference signal resource indication information is further used to indicate the reference signal resource corresponding to the adjacent second PRG.

In one embodiment, the size of the second PRG is equal to a size of m first PRGs.

In one embodiment, the first PRG is a first PRG whose PRG number is minimum or maximum in the m first PRGs corresponding to the second PRG, and the reference signal resource corresponding to the second PRG is a reference signal resource in the at least one reference signal resource corresponding to the first PRG whose PRG number is minimum or maximum in the m first PRGs, where m is a positive integer.

In one embodiment, a frequency domain start/end position of the first PRG is the same as a frequency domain start/end position of the n second PRGs.

In one embodiment, the frequency domain start/end position of the first PRG is the same as the frequency domain start/end position of a resource block group RBG of the terminal device, and the frequency domain start/end position of the second PRG is the same as the frequency domain start/end position of the RBG of the terminal device.

In one embodiment, the first PRG includes an entire frequency band that is used by the network device to receive the reference signal.

In one embodiment, the transceiver 1420 is further configured to send resource configuration information before receiving the precoded PUSCH on the second PRG, where the resource configuration information indicates a frequency domain resource used to transmit the PUSCH, and the resource configuration information indicates the frequency domain resource in a frequency band used by the terminal device to transmit the at least one reference signal.

In one embodiment, the transceiver 1420 is further configured to: before receiving the at least one precoded reference signal on the at least one reference signal resource corresponding to the first PRG, send first indication information carried in higher layer signaling or downlink control information DCI, where the first indication information is used to indicate at least one of the following:

the size of the first PRG, the size of the second PRG, and the relationship indicating that the size of the first PRG is k times the size of the second PRG.

In one embodiment, the network device receives the at least one reference signal in a plurality of reference signal processes. In the plurality of reference signal processes, a size of a first PRG in each reference signal process is the same as or different from a size of a first PRG in another reference signal process, and the reference signal resource corresponding to the second PRG is at least one of at least one reference signal resource corresponding to the first PRG that is of a reference signal process selected from the plurality of reference signal processes and that is indicated by using signaling.

In one embodiment, the reference signal includes the sounding reference signal SRS.

It should be understood that in this embodiment of this application, the processor 1410 may be a central processing unit (CPU), or the processor 1410 may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor or the like.

The memory 1430 may include a read-only memory and a random access memory, and provide an instruction and data to the processor 1410. A part of the memory 1430 may further include a non-volatile random access memory. For example, the memory 1430 may further store information about a device type.

In an implementation process, operations in the foregoing method may be implemented by using an integrated logical circuit of hardware in the processor 1410, or instructions in a form of software. The operations of the positioning method disclosed with reference to the embodiments of this application may be directly performed by a hardware processor, or may be performed by using a combination of hardware in the processor 1410 and a software module. The software module may be located in a mature storage medium in the art, such as a random access memory, a flash memory, a read-only memory, a programmable read-only memory, an electrically erasable programmable memory, or a register. The storage medium is located in the memory 1430, and the processor 1410 reads information from the memory 1430 and completes the operations in the foregoing methods in combination with the hardware of the processor. To avoid repetition, details are not described herein again.

The network device 1400 in this embodiment of this application may be corresponding to the network device configured to perform the method 600 in the foregoing method 600, and the network device 1200 in the embodiments of this application. In addition, units or modules in the network device 1400 are separately configured to perform the actions or processing processes performed by the network device in the foregoing method 600. Herein, to avoid repetition, detailed descriptions are omitted.

Figure 15:
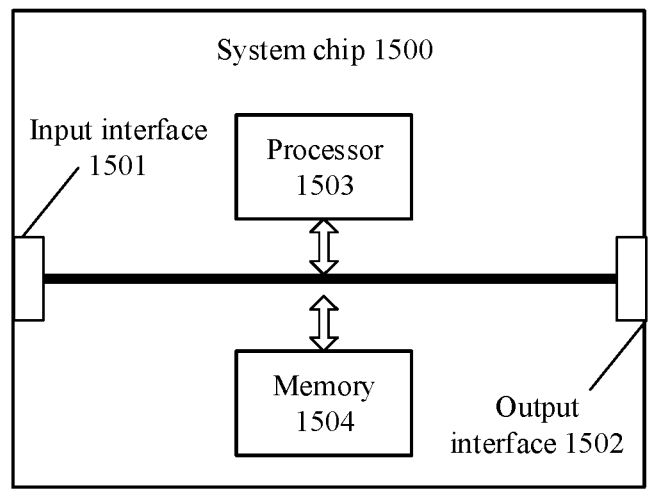
FIG. 15 is a schematic structural diagram of a system chip according to an embodiment of this application.

FIG. 15 is a schematic structural diagram of a system chip according to an embodiment of this application. A system chip 1500 in FIG. 15 includes an input interface 1501, an output interface 1502, at least one processor 1503, and a memory 1504. The input interface 1501, the output interface 1502, the processor 1503, and the memory 1504 are connected to each other over an internal connection path. The processor 1503 is configured to execute code in the memory 1504.

In one embodiment, when the code is executed, the processor 1503 may implement the method 300 performed by the terminal device in the method embodiment. For brevity, details are not described herein again.

In one embodiment, when the code is executed, the processor 1503 may implement the method 300 performed by the network device in the method embodiment. For brevity, details are not described herein again.

A person of ordinary skill in the art may be aware that, in combination with the examples described in the embodiments disclosed in this specification, units and algorithm operations may be implemented by electronic hardware or a combination of computer software and electronic hardware. Whether these functions are performed by hardware or software depends on specific applications and design constraints of the technical solutions. A person skilled in the art may use different methods to implement the described functions for each particular application, but it should not be considered that such implementation goes beyond the scope of this application.

It may be clearly understood by a person skilled in the art that, for convenience and brevity, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units are integrated into one unit.

When functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the operations of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of the embodiments of this application. Any variation or replacement readily figured out by a person skilled in the art within the technical scope disclosed in the embodiments of this application shall fall within the protection scope of the embodiments of this application. Therefore, the protection scope of the embodiments of this application shall be subject to the protection scope of the claims.

What is claimed is:

1. A data transmission method, wherein the method comprises:

sending, by a terminal device, at least one precoded reference signal on at least one reference signal resource corresponding to a first precoding resource block group (PRG), wherein different reference signals in the at least one precoded reference signal are precoded by using different precoding matrixes, the first PRG is a PRG of the at least one precoded reference signal, and the at least one precoded reference signal comprises a sounding reference signal (SRS);

receiving, by the terminal device, reference signal resource indication information, wherein the reference signal resource indication information is used to indicate a reference signal resource corresponding to a second PRG, and the reference signal resource corresponding to the second PRG is at least one reference signal resource selected from the at least one reference signal resource corresponding to the first PRG whose frequency domain position is the same as that of the second PRG, the second PRG is a PRG of a physical uplink shared channel (PUSCH), and a size of the first PRG is equal to n times a size of the second PRG, wherein n is 1 or a positive integer greater than 1; and sending, by the terminal device, a precoded PUSCH on the second PRG based on the reference signal resource indication information, wherein a precoding matrix used for the PUSCH is determined based on a precoding matrix used for a reference signal sent on the reference signal resource corresponding to the second PRG, and the reference signal resource indication information is carried in downlink control information (DCI), a media access control control element (MAC CE), or a physical downlink shared channel (PDSCH).

2. The method according to claim 1, wherein at least a part of at least one precoding matrix used for the at least one reference signal sent on the first PRG is different from at least one precoding matrix used for at least one reference signal sent on another first PRG, the another first PRG is a first PRG that is in a plurality of first PRGs and whose frequency domain position is different from that of the first PRG, and a plurality of reference signal resources corresponding to a plurality of second PRGs of the PUSCH are at least one reference signal resource selected from a plurality of reference signal resources corresponding to the plurality of first PRGs whose frequency domain positions are the same as frequency domain positions of the plurality of second PRGs.

3. The method according to claim 1, wherein if the reference signal resource corresponding to the second PRG is the same as a reference signal resource corresponding to an adjacent second PRG of the second PRG in n second PRGs whose frequency domain positions are the same as that of the first PRG, and the second PRG is a second PRG whose PRG number is minimum or maximum in the n second PRGs, the reference signal resource indication information is further used to indicate the reference signal resource corresponding to the adjacent second PRG.

4. The method according to claim 1, wherein a frequency domain start/end position of the first PRG is the same as a frequency domain start/end position of a nth second PRGs.

5. The method according to claim 1, wherein the first PRG is an entire frequency band used by the terminal device to transmit the at least one reference signal.

6. The method according to claim 1, wherein before the sending, by the terminal device, a precoded PUSCH on the second PRG, the method further comprises:
  receiving, by the terminal device, resource configuration information, wherein the resource configuration information indicates a frequency domain resource used to transmit the PUSCH, and the resource configuration information indicates the frequency domain resource in a frequency band used by the terminal device to transmit the at least one reference signal.

7. The method according to claim 1, wherein before the sending, by a terminal device, at least one precoded reference signal on at least one reference signal resource corresponding to a first PRG, the method further comprises:
  receiving, by the terminal device, first indication information carried in higher layer signaling or downlink control information (DCI), wherein the first indication information is used to indicate at least one of the following:
  the size of the first PRG, the size of the second PRG, and a relationship indicating that the size of the first PRG is k times the size of the second PRG, wherein k is 1 or a positive integer greater than 1.

8. The method according to claim 1, wherein the terminal device sends the reference signal by using a plurality of reference signal processes, and in the plurality of reference signal processes, a size of a first PRG in each reference signal process is the same as or different from a size of a first PRG in another reference signal process, and the reference signal resource corresponding to the second PRG is at lea 51 one of at least one reference signal resource corresponding to the first PRG that is of a reference signal process selected from the plurality of reference signal processes and that is indicated by using signaling.

9. A data transmission method, wherein the method comprises:
  receiving, by a network device, at least one precoded reference signal on at least one reference signal resource corresponding to a first precoding resource block group (PRG), wherein different reference signals in the at least one precoded reference signal are precoded by using different precoding matrixes, the first PRG is a PRG of the at least one precoded reference signal, and the at least one precoded reference signal comprises a sounding reference signal (SRS);
  sending, by the network device, reference signal resource indication information, wherein the reference signal resource indication information is used to indicate a reference signal resource corresponding to a second PRG, and the reference signal resource corresponding to the second PRG is at least one reference signal resource selected from the at least one reference signal resource corresponding to the first PRG whose frequency domain position is the same as that of the second PRG, the second PRG is a PRG of a physical uplink shared channel (PUSCH), and a size of the first PRG is equal to n times a size of the second PRG, wherein n is 1 or a positive integer greater than 1; and
  receiving, by the network device, a precoded PUSCH on the second PRG, wherein a precoding matrix used for the PUSCH is determined based on a precoding matrix used for a reference signal sent on the reference signal resource corresponding to the second PRG, and the reference signal resource indication information is carried in downlink control information DCI, a media access control control element (MAC CE), or a physical downlink shared channel (PDSCH).

10. The method according to claim 9, wherein at least a part of at least one precoding matrix used for the at least one reference signal sent on the first PRG is different from at least one precoding matrix used for at least one reference signal sent on another first PRG, the another first PRG is a first PRG that is in a plurality of first PRGs and whose frequency domain position is different from that of the first PRG, and a plurality of reference signal resources corresponding to a plurality of second PRGs of the PUSCH are at least one reference signal resource selected from a plurality of reference signal resources corresponding to the plurality of first PRGs whose frequency domain positions are the same as frequency domain positions of the plurality of second PRGs.

11. The method according to claim 9, wherein if the reference signal resource corresponding to the second PRG is the same as a reference signal resource corresponding to an adjacent second PRG of the second PRG in n second PRGs whose frequency domain positions are the same as that of the first PRG, and the second PRG is a second PRG whose PRG number is minimum or maximum in the n second PRGs, the reference signal resource indication information is further used to indicate the reference signal resource corresponding to the adjacent second PRG.

12. The method according to claim 9, wherein a frequency domain start/end position of the first PRG is the same as a frequency domain start/end position of the n second PRGs.

13. The method according to claim 9, wherein the first PRG comprises an entire frequency band used by the network device to receive the at least one reference signal.

14. The method according to claim 9, wherein before the receiving, by the network device, a precoded PUSCH on the second PRG, the method further comprises:
  sending, by the network device, resource configuration information, wherein the resource configuration information indicates a frequency domain resource used to transmit the PUSCH, and the resource configuration information indicates the frequency domain resource in a frequency band used by a terminal device to transmit the at least one reference signal.

15. The method according to claim 9, wherein before the receiving, by a network device, at least one precoded reference signal on at least one reference signal resource corresponding to a first PRG, the method further comprises:
  sending, by the network device, first indication information carried in higher layer signaling or downlink control information (DCI), wherein the first indication information is used to indicate at least one of the following:
  the size of the first PRG, the size of the second PRG, and a relationship indicating that the size of the first PRG is k times the size of the second PRG, wherein k is 1 or a positive integer greater than 1.

16. The method according to claim 9, wherein the network device receives the at least one reference signal in a plurality of reference signal processes, and in the plurality of reference signal processes, a size of a first PRG in each reference signal process is the same as or different from a size of a first PRG in another reference signal process, and the reference signal resource corresponding to the second PRG is at least one reference signal resource corresponding to the first PRG of a selected reference signal process in the plurality of reference signal processes.

17. A data transmission terminal device, comprising:
   a processor; and
   a memory coupled to the processor to store instructions, which when executed by the processor, cause the processer to perform operations, the operations including
   sending at least one precoded reference signal on at least one reference signal resource corresponding to a first precoding resource block group PRG, wherein different reference signals in the at least one precoded reference signal are precoded by using different precoding matrixes, the first PRG is a PRG of the at least one precoded reference signal, and the at least one precoded reference signal comprises a sounding reference signal (SRS);
   receiving; reference signal resource indication information, wherein the reference signal resource indication information is used to indicate a reference signal resource corresponding to a second PRG, and the reference signal resource corresponding to the second PRG is at least one reference signal resource selected from the at least one reference signal resource corresponding to the first PRG whose frequency domain position is the same as that of the second PRG, the second PRG is a PRG of a physical uplink shared channel (PUSCH), and a size of the first PRG is equal to n times a size of the second PRG, wherein n is 1 or a positive integer greater than 1; and
   sending a precoded PUSCH on the second PRG based on the reference signal resource indication information, wherein a precoding matrix used for the PUSCH is determined based on a precoding matrix used for a reference signal sent on the reference signal resource corresponding to the second PRG, and the reference signal resource indication information is carried in downlink control information (DCI), a media access control control element (MAC CE), or a physical downlink shared channel (PDSCH).

18. The terminal device according to claim 17, wherein at least a part of at least one precoding matrix used for the at least one reference signal sent on the first PRG is different from at least one precoding matrix used for at least one reference signal sent on another first PRG, the another first PRG is a first PRG that is in a plurality of first PRGs and whose frequency domain position is different from that of the first PRG, and a plurality of reference signal resources corresponding to a plurality of second PRGs of the PUSCH are at least one reference signal resource selected from a plurality of reference signal resources corresponding to the plurality of first PRGs whose frequency domain positions are the same as frequency domain positions of the plurality of second PRGs.

19. The terminal device according to claim 17, wherein if the reference signal resource corresponding to the second PRG is the same as a reference signal resource corresponding to an adjacent second PRG of the second PRG in n second PRGs whose frequency domain positions are the same as that of the first PRG, and the second PRG is a second PRG whose PRG number is minimum or maximum in the n second PRGs, the reference signal resource indication information is further used to indicate the reference signal resource corresponding to the adjacent second PRG.

20. The terminal device according to claim 17, wherein a frequency domain start/end position of the first PRG is the same as a frequency domain start/end position of a nth second PRGs.

* * * * *

UNITED STATES PATENT AND TRADEMARK OFFICE
CERTIFICATE OF CORRECTION

| | | |
|---|---|---|
| PATENT NO. | : 11,139,936 B2 | Page 1 of 1 |
| APPLICATION NO. | : 16/673111 | |
| DATED | : October 5, 2021 | |
| INVENTOR(S) | : Xianda Liu et al. | |

It is certified that error appears in the above-identified patent and that said Letters Patent is hereby corrected as shown below:

In the Claims

In Claim 8, Column 35, Lines 39-40, "PRG is at lea 51 one of at least one" should be --PRG is at least one--.

In Claim 12, Column 36, Line 36, "position of the n second PRGs." should be --position of an nth second PRGs.--.

In Claim 17, Column 37, Line 10, "processer" should be --processor--.

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*